(12) United States Patent
Minematsu et al.

(10) Patent No.: US 11,750,398 B2
(45) Date of Patent: Sep. 5, 2023

(54) MAC TAG LIST GENERATION APPARATUS, MAC TAG LIST VERIFICATION APPARATUS, AGGREGATE MAC VERIFICATION SYSTEM AND METHOD

(71) Applicant: NEC Corporation, Tokyo (JP)

(72) Inventors: Kazuhiko Minematsu, Tokyo (JP); Norifumi Kamiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 337 days.

(21) Appl. No.: 17/279,265

(22) PCT Filed: Sep. 27, 2018

(86) PCT No.: PCT/JP2018/035917
§ 371 (c)(1),
(2) Date: Mar. 24, 2021

(87) PCT Pub. No.: WO2020/065820
PCT Pub. Date: Apr. 2, 2020

(65) Prior Publication Data
US 2022/0006643 A1 Jan. 6, 2022

(51) Int. Cl.
*H04L 9/32* (2006.01)
*G06F 7/58* (2006.01)
*G06F 7/78* (2006.01)

(52) U.S. Cl.
CPC ............ *H04L 9/3242* (2013.01); *G06F 7/584* (2013.01); *G06F 7/78* (2013.01)

(58) Field of Classification Search
CPC ........... H04L 9/3242; G06F 7/584; G06F 7/78

USPC .......................................................... 380/28
See application file for complete search history.

(56) References Cited

U.S. PATENT DOCUMENTS

| | | | |
|---|---|---|---|
| 9,680,653 B1* | 6/2017 | Bradbury | ............ G06F 9/30018 |
| 2002/0051537 A1* | 5/2002 | Rogaway | ............... H04L 9/3242 |
| | | | 380/46 |
| 2007/0189524 A1* | 8/2007 | Rogaway | ............... H04L 9/3242 |
| | | | 380/37 |

(Continued)

FOREIGN PATENT DOCUMENTS

| | | |
|---|---|---|
| JP | 2017-005409 A | 1/2017 |
| JP | 2017-073716 A | 4/2017 |

(Continued)

OTHER PUBLICATIONS

International Search Report for PCT Application No. PCT/JP2018/035917, dated Jan. 8, 2019.

(Continued)

*Primary Examiner* — Dereena T Cattungal
(74) *Attorney, Agent, or Firm* — Sughrue Mion, PLLC

(57) ABSTRACT

A MAC tag list generation apparatus, on reception of a nonce N unique value to each MAC generation process and a message M, generates a t×m group test matrix H serving as combinatorial group testing parameters for s (a positive integer) which is the number of the MACs to be generated, generates a MAC tag list T=(T[1], . . . , T[t]) by generating a MAC value T[i] corresponding to the i-th test (i=1, . . . , t) using the group test matrix H, the nonce N, and pseudo-random functions F and G with variable length input and fixed length output for the message M, and outputs the MAC tag list.

19 Claims, 12 Drawing Sheets

(56) References Cited

U.S. PATENT DOCUMENTS

| | | | |
|---|---|---|---|
| 2009/0138710 A1* | 5/2009 | Minematsu | H04L 9/0631 713/170 |
| 2012/0057702 A1 | 3/2012 | Minematsu | |
| 2013/0073865 A1* | 3/2013 | Kornafeld | H04L 9/3231 713/189 |
| 2016/0173276 A1 | 6/2016 | Minematsu | |
| 2018/0013550 A1 | 1/2018 | Minematsu | |

FOREIGN PATENT DOCUMENTS

| | | |
|---|---|---|
| JP | 2018-093363 A | 6/2018 |
| WO | 2010/131563 A1 | 11/2010 |
| WO | 2015/015702 A1 | 2/2015 |
| WO | 2016/063512 A1 | 4/2016 |
| WO | 2016/067524 A1 | 5/2016 |

OTHER PUBLICATIONS

Morris Dworkin, "Recommendation for Block Cipher Modes of O7peration: the CMAC Mode for Authentication", NIST Special Publication 800-38B, National Institute of Standards and Technology, U.S. Department of Commerce, pp. 1-16, May 2005.

Mihir Bellare et al., "Keying hash functions formessage authentication", CRYPTO 1996 Proceedings, Lecture Notes in Computer Sciece vol. 1109, N. Koblitz ed., Springer-Verlag, 1996, pp. 1-15, Jun. 1996.

Michael T. Goodrich et al., "Indexing Information for Data Forensics", Applied Cryptography and Network Security, Third International Conference, ACNS 2005, NewYork, NY, USA, Jun. 7-10, 2005, Proceedings. 2005 Lecture Notes inComputer Science ISBN 3-540-26223-7, pp. 206-221.

Kazuhiko Minematsu,"Efficient Message AuthenticationCodes with Combinatorial Group Testing", ESORICS 2015. Lecture Notes in Computer Science, vol. 9326.ISBN 978-3-319-24174-6, pp. 1-20.

Giovanni Di Crescenzo et al., "Corruption-Localizing Hashing",Computer Security—ESORICS2009, 14th European Symposium on Research in Computer Security, Saint-Malo, France, Sep. 21-23, 2009. Proceedings. Springer 2009 Lecture Notes in Computer Science ISBN 978-3-642-04443-4, pp. 489-504.

Ely Porat et al., "Explicit Non-adaptive Combinatorial Group Testing Schemes" ICALP (1) 2008: 748-759, pp. 1-15.

Jonathan Katz et al.,"Aggregate message authentication codes",CT-RSA 2008, vol. 4964 of Lecture Notes in Computer Science. Springer, 2008, pp. 1-11.

Shoichi Hirose et al.,"Non-adaptive Group-Testing Aggregate MAC Scheme.",ISPEC2018, IACR ePrint 2018/448, [URL:https://eprint.iacr.org/2018/448], pp. 1-15.

Mihir Bellare et al., "XOR MACs: New Methods for Message Authentication Using Finite Pseudorandom Functions", CRYPTO 95 Proceedings, Lecture Notes in Computer Science vol. 963, D. Coppersmith ed., Springer—Verlag, 1005. Feb. 2005, pp. 1-21.

Anthony J Macula,"A simple construction of d-disjunct matrices with certain constant weights", Discrete Mathematics 162 (1996) pp. 311-312.

* cited by examiner

MAC TAG LIST GENERATION APPARATUS, MAC TAG LIST VERIFICATION APPARATUS, AGGREGATE MAC VERIFICATION SYSTEM AND METHOD

This application is a National Stage Entry of PCT/JP2018/035917 filed on Sep. 27, 2018, the contents of all of which are incorporated herein by reference, in their entirety.

FIELD

The present invention relates to a MAC tag list generation apparatus, MAC tag list verification apparatus, aggregate MAC verification system, MAC tag list generation method, and MAC tag list verification method.

BACKGROUND

Message Authentication Code (hereinafter simply referred to as "message authentication" or "MAC") is a technology for ensuring legitimacy of a message by assigning thereto a tag that can be computed only by those who know a secret key. For example, by using message authentication, it becomes possible to detect tampering by a third party during communication between two parties who share a secret key. More specifically, when a sender sends a message and a tag to a receiver, the receiver can determine whether the message was sent by a legitimate sender by calculating a tag from the received message and see if the calculated tag matches the received tag. This tag is termed "authentication tag" or "MAC tag".

The following describes basic input and output of MAC. Consider two parties Alice and Bob who share a secret key K. Alice sends a message M to Bob. In this case, Alice applies a MAC function MAC_K using a secret key K to M, obtains the authentication tag T=MAC_K (M), and sends (M, T) to Bob.

Assuming that information received by Bob is (W, T'), Bob sees if T' matches MAC_K(M') to determine whether the message was sent by Alice. By verifying that 'T' matches MAC_K(M'), Bob can see if the received message (M', T') is a pair (message, authentication tag) that Alice sent, and can check for presence or absence of tampering.

Non-Patent Literature (NPL) 1 [CMAC] and NPL 2 [HMAC] disclose examples of this kind of a message authentication method.

When using general message authentication, it is impossible to obtain information about a tampered position in a message. This is because if tampering occurs, a value of an authentication tag will be a random value different from a correct value.

In contrast, by dividing a message into arbitrary parts and applying a MAC function to each of the parts divided, rather than applying a MAC function once to an entirety of the message, it is possible to perform checking for each part and completely identify a tampered position in the message. For example, if a message M consists of m items M[1], ..., M[m], the following computation for each item is performed, T[1]=MAC_K(M[1]), T[2]=MAC_K(M[2]), ..., T[m]=MAC_K(M[m]). Then, a set of the message and the authentication tags (M, T[1], ..., T[m]) may be sent.

For example, this method can be used by computing a MAC for data on a hard disk, on a per file basis or on a per disk sector basis. However, in this method, m tags are generated for m items, which causes a problem that an amount of data to be stored increases significantly.

NPL 3 [GAT05] discloses an approach that factorizes a message into a plurality of subseries having different lengths that being allowed to overlap each other and apply a MAC to each subseries.

Example 1

For example, when a message M is constituted by seven items, (M[1], M[2], ..., M[7]) is factorized into three subseries.

$S[1]=(M[1],M[2],M[3],M[4])$ $S[2]=(M[1],M[2],M[5],M[6])$ $S[3]=(M[1],M[3],M[5],M[7])$

Then, MAC is applied to each of the three subseries and following three tags are computed.

$T[1]=MAC(S[1]), \ldots, T[3]=MAC(S[3])$

In this case, it is possible to reduce the number of tags to three, whereas seven tags are required when MAC is applied to each item. Further, it is assumed that a verification result for each (T[i], S[i]) is represented by a binary number B[i] (where a value 0 indicates that MAC is correct, while a value 1 indicates occurrence of tampering. In a case where check results of MAC tags for a message M at a certain time point are $B[1]=0$, $B[2]=1$, and $B[3]=0$, it is possible to identify that M[6] is tampered. More precisely, in this example, if any one of items is tampered, it is possible to identify the item tampered.

Generally speaking, this property indicates that by devising factorization into subseries, it is possible to identify a tampered item(s), when the number of tampered item(s) is not more than a given threshold value.

Into what subseries the message M is factorized and what tampered item can be identified as a result of testing of the subseries are closely related to a combinatorial scheme called combinatorial group testing (CGT), especially related to nonadaptive combinatorial group testing (NCGT). NPL 3 [GAT05] and NPL 4 [Min15] investigate these testing schemes. In the CGT constituted by m items and t tests, a binary matrix H with t rows and m columns (herein referred to as a "test matrix") is constructed and testing is performed according to H. This indicates that, when an element at i-th row and j-th column of H is 1, the i-th item is included in the j-th test.

For example, when an aspect of practical use such as application to a database system is considered, it is unlikely that a wrongdoer will perform tampering of a large number of items at once, due to realistic system constraints or the like. Therefore, the combination of CGT and MAC described above makes it possible to build a database system enabled to identify a position of tampering that may possibly happen realistically, while a total number of tags is kept reduced. It is noted that, as with a normal MAC, the combination of CGT and MAC will be able to detect, for any tampering, a fact that there was tampering.

Further, even when a hash function without a key, such as corruption-localizing hashing described in NPL 5 [CJS09], is used instead of MAC, a similar effect can be expected under a premise that the hash value is stored in a safe place separate from a message. In addition, it is generally possible to narrow down a tampered range even when failing to identify a tampered item.

Next, a method for constructing a test matrix will be described. It is known that, when efficiently identifying at most d tampered items among m items, the test matrix may suffice to meet a property called d-disjunct.

More specifically, a t-rows and m-columns binary matrix H is d-disjunct if, when a Boolean sum (bitwise logical OR) of any d columns of H is X, none of remaining m−d columns is included in X.

This indicates that, let I(S) denote a row index set in which X is 1, I(Y) is not a subset of I(X) for any one column Y selected from remaining m−d columns.

For a minimum number of rows in a d-disjunct matrix t_min(d, m) (i.e., a minimum number of tests that can identify at most d items of tampering) for given d, m, the following holds.

$$t\_min(d,m)=O(d^2 \log m) \qquad \text{(Expression 1)}$$

The method for achieving this with d=1 is well known, and the matrix can be constructed from a Hamming code parity-check matrix.

For example, [Example 1] described above is such an example with m=7, the corresponding 1-disjunct matrix is as follows.

[1111000]

[1100110]

[1010101]   (Expression 2)

Meanwhile, there are several construction methods with d>1, but it is generally difficult to construct an optimal method. For example, NPL 6 [PR08] is known as a method for generally achieving $O(d^2 \log m)$, however, an actual efficiency inclusive of a constant rather than an order, is unknown. Further, for d somewhat larger than m, it is known that construction of a non-trivial d-disjunct matrix (i.e., not an identity matrix) is theoretically impossible.

Further, as another application of NCGT, there is an aggregate MAC (see NPL 7 [KL08]).

The following describes the aggregate MAC in detail. As a typical scenario of the aggregate MAC, such an application is considered in which each of m nodes S_1, ..., and S_m independently computes a MAC for a message and a single verification node C verifies them.

Here, let a message sent from a node S_i be M[i], a key unique to the node S_i be K[i], and a MAC tag T_i=MAC (K_i, M_i). In a general method not using an aggregate MAC, transmission information from the node S_i includes (M[i], T[i]) and information received by the verification node C includes (M[1], T[1]), ..., and (M[m], T[m]). The verification node C holds K[1], ..., and K[m] and authenticates (M[i], T[i]) for each i.

In this method, depending on the application, transmission amount of m tags could pose a problem. By providing an aggregator node (Aggregator) A between the verification node C and the nodes S_1, ..., and S_m, the aggregate MAC aims to reduce communication amount relating to tags of A and C.

The aggregator node A does not have a key and only performs reduction based on tag aggregation. In the aggregate MAC of NPL 7 [KL08], an aggregator node A takes a sum of all tags. That is, after receiving (M[1], T[1]), ..., (M[m], T[m]), the aggregator node A obtains an aggregate tag V=T[1]+T[2]+ ... +T[m] and sends (M[1], ..., M[m], V) to the verification node C.

The verification node C can perform verification of V by deriving T[i] for each i, using K[1], ..., and K[m].

In the aggregate MAC described above, if there is no tampering with all contents transmitted by all nodes, the above verification will be successful for all the transmitted contents. However, when contents transmitted by some nodes are tampered (these are referred to as "tampered nodes" hereinafter), it is not possible to identify which node's transmission contents have been tampered.

NPL 8 [HS18] proposes that the aggregator node A obtain a plurality of partial sums of tags according to a d-disjunct matrix for transmission. For example, for the contents received from seven nodes (M[1], T[1]), ..., and (M[7], T[7]), the aggregator node A of NPL 8 [HS18] obtains $$V[1]=T[1]+T[2]+T[3]+T[4]$$

$$V[2]=T[1]+T[2]+T[5]+T[6]$$

$$V[3]=T[1]+T[3]+T[5]+T[7]$$

and sends (M[1], ..., M[7], V[1], V[2], V[3]) to the verification node C.

This uses the 1-disjunct matrix of (Expression 2). hence, it is possible to identify tampering of a single node.

In addition, Patent Literature (PTL) 1 discloses a message authentication code (MAC) tag list generation apparatus enabled to obtain information not only on whether or not tampering has taken place, but also on a tampered position. According to PTL 1, the tag list generation apparatus includes a message input part that receives a message constituted by m items M[1] ... [m] (m is a positive integer), a group test matrix generation part, and a tag list generation part. For the number s of generated message authentication code tags (s is a positive integer), the group test matrix generation part generates an s-rows and m columns group test matrix that determines combinatorial group testing. Further, the tag list generation part generates a tag list constituted by s tags related to the message using the group test matrix, a pseudorandom function with variable length input and fixed length output, and a Tweaked pseudorandom function with fixed length input and output. Further, the tag list generation part computes the tag relating to each of the m items M[1] ... [m] constituting the message in parallel and shares computation halfway results.

PTL 2 discloses an example of an authenticated encryption apparatus enable to efficiently prevent a bandwidth increase. Further, PTL 2 discloses a configuration that includes initial vector generation means (fixed length value generation part) for generating a n-bit initial vector N (fixed length value, nonce) different from values generated in the past (see FIG. 1 of Patent Literature 2).

Further, NPL 9 [BGR95] proposes a MAC function used for tag generation. NPL 10 [M96] introduces a method for constructing a d-disjunct matrix.

PTL 1: Japanese Unexamined Patent Application Publication No. JP2017-73716A

PTL 2 International Publication Number WO2016/067524A

NPL 1 [CMAC], SP 800-38B, "Recommendation for Block Cipher Modes of Operation: The CMAC Mode for Authentication," (May 2005).

NPL 2 [HMAC], M. Bellare, R. Canetti, H. Krawczyk, "Keying Hash Functions for Message Authentication," CRYPTO 1996, pp. 1-15, Springer, Heidelberg (1996).

NPL 3 [GAT05], Michael T. Goodrich, Mikhail J. Atallah, Roberto Tamassia, "Indexing Information for Data Forensics," Applied Cryptography and Network Security, Third International Conference, ACNS 2005, New York, N.Y., USA, Jun. 7-10, 2005, Proceedings, 2005, Lecture Notes in Computer Science, ISBN 3-540-26223-7, pp. 206-221.

NPL 4 [Min15], Kazuhiko Minematsu, "Efficient Message Authentication Codes with Combinatorial Group Testing," ESORICS 2015, Lecture Notes in Computer Science, vol. 9326, ISBN 978-3-319-24174-6.

NPL 5 [CJC09], Giovanni Di Crescenzo, Shaoquan Jiang, Reihaneh Safavi-Naini, "Corruption-Localizing Hashing," Computer Security-ESORICS 2009, 14th European Symposium on Research in Computer Security, Saint-Malo, France, Sep. 21-23, 2009, Proceedings, Springer 2009 Lecture Notes in Computer Science ISBN 978-3-642-04443-4, pp. 489-504.

NPL 6 [PR08], Ely Porat, Amir Rothschild, "Explicit Non-Adaptive Combinatorial Group Testing Schemes," ICALP (1) 2008: 748-759.

NPL 7[KL08], Jonathan Katz and Yehuda Lindell, "Aggregate Message Authentication Codes," CT-RSA 2008, volume 4964 of Lecture Notes in Computer Science, Springer, 2008.

NPL 8 [HS18], Shoichi Hirose and Junji Shikata, "Nonadaptive Group-Testing Aggregate MAC Scheme," ISPEC 2018, IACR ePrint 2018/448, the Internet <URL: https://eprintiacr.org/2018/448>

NPL 9[BGR95], Mihir Bellare, Roch Guérin, and Phillip Rogaway, "XOR MACs: New Methods for Message Authentication Using Finite Pseudorandom Functions," CRYPTO 95.

NPL 10 [M96], Anthony J. Macula, "A simple construction of d-disjunct matrices with certain constant weights," Discrete Mathematics 162 (1996), pp. 311-312.

SUMMARY

The following analysis is given by the present invention. A first issue of the present invention is to perform message authentication that can obtain information not only on whether or not tampering has taken place, but also on a tampered position more efficiently than a method disclosed in NPL 3 [GAT05], NPL 4 [Min15] or the like.

More specifically, in the method disclosed in NPL 3 [GAT05], NPL 4 [Min15] or the like, a test matrix used for tag generation is directly constructed based on a theory of nonadaptive combinatorial group testing (NCGT). According to the method disclosed in NPL 3 [GAT05], NPL 4 [Min15] or the like, a test matrix is typically constructed from a d-disjunct matrix, and hence there is a problem that an effective method cannot be implemented for parameters for which it is difficult to construct a d-disjunct matrix (d, item number m, and testing number t).

Although a method for constructing an optimal matrix in a case of d=1 is well known as stated in Background, an optimum construction method in a case of d>1 is not known, and when d increases to some extent, there is no d-disjunct matrix that is non-trivial, i.e., t<m.

It is an object of the present invention to provide a MAC tag list generation apparatus, MAC tag list verification apparatus, aggregate MAC verification system, MAC tag list generation method, and MAC tag list verification method, each capable of contributing to further improving efficiency of message authentication that can obtain information not only on whether or not tampering has taken place, but also on a position of tampering.

According to a first aspect, there is provided a message authentication code (MAC) tag list generation apparatus including a message input part that receives a nonce N that is a unique value to each MAC generation process and a message M constituted by m items M[1], . . . , M[m], each of which is a MAC target; a group test matrix generation part that generates a t rows and m columns group test matrix H as combinatorial group testing parameters for s (s is a positive integer), which is the number of MACs to be generated; a nonce-based linear CGT MAC application part that generates, for the message M, a MAC tag list T=(T[1], . . . , T[t]) by generating a MAC value T[i] corresponding to the i-th test (i=1, . . . , t), by using the group test matrix H, the nonce N, and pseudorandom functions F and G, both having variable length input and fixed length output; and a MAC tag list output part that outputs the MAC tag list obtained by the nonce-based linear CGT MAC application part.

According to a second aspect, there is provided a message authentication code (MAC) tag list verification apparatus including a message input part that receives MAC tag list verification targets: a nonce N, a message M constituted by m items M[1], . . . , M[m], and a MAC tag list T=(T[1], . . . , T[t]), which is a list of t MAC values; a group test matrix generation and expansion part that generates a t×m group test matrix H serving as combinatorial group testing parameters and outputs a test matrix expansion rule R constituted by v elements (where v>t) that are subsets of the row indices of the group test matrix H; a nonce-based linear CGT MAC application part that generates a verification MAC tag list T*=(T*[1], . . . , T*[t]) by generating a MAC value T*[j] corresponding to the j-th test (j=1, . . . , t) using the group test matrix H, the nonce N, and pseudorandom functions F and G with variable length input and fixed length output for the message M; a MAC tag list expansion part that outputs an expanded MAC tag list exT and an expanded verification MAC tag list exT* by performing linear combination in each of the MAC tag list T and the verification MAC tag list T* corresponding to subsets of the row indices specified by the test matrix expansion rule R and using the MAC tag list T, the verification MAC tag list T*, and the test matrix expansion rule R; a MAC tag list verification part that compares the expanded MAC tag list exT with the expanded verification MAC tag list exT*, verifies each item in the message M, identifies the position of any tampered item, and outputs the results as the verification result; and a verification result output part that outputs the verification result outputted by the MAC tag list verification part.

According to a third aspect, there is provided an aggregate message authentication code (MAC) verification system including an aggregator node that comprises a group test matrix generation part that outputs a t×m group test matrix H; a MAC tag aggregation part that receives m message-tag pairs (M[1], T[1]), . . . , M[m], T[m]) sent from m nodes, each of which comprising a message input part that receives a message M[i] and a MAC generation part that obtains a single MAC tag T[i] for the message M[i] and outputs the tag, aggregates tags according to the group test matrix H, and outputs an aggregate tag list V=(V[1], . . . , V[t]) constituted by t aggregate tags and a message list M=(M[1], . . . , M[m]); and a group test matrix generation part that outputs a test matrix expansion rule R constituted by a plurality of subsets of the row indices of the group test matrices H; and a verification node that comprises an aggregate MAC tag list expansion part that obtains a linear combination of the elements in the aggregate tag list V according to the test matrix expansion rule R and outputs an expanded aggregate tag list exV; an expanded aggregate MAC tag list verification part that performs verification using the message list M, the expanded aggregate tag list exV, and the test matrix expansion rule R, identifies any tampered node, and outputs the results as the verification result; and a verification result output part that outputs the verification result outputted by the expanded aggregate MAC tag list verification part.

According to a fourth aspect, there is provided a message authentication code (MAC) tag list generation method including a step of receiving a nonce N that is a unique value to each MAC generation process and a message M constituted by m items M[1], . . . , M[m] to which a MAC is applied; a step of generating a t×m group test matrix H serving as combinatorial group testing parameters for s (where s is a positive integer) which is the number of the MACs to be generated; a step of generating a MAC tag list T=(T[1], . . . , T[t]) by generating a MAC value T[i] corresponding to the i-th test (i=1, . . . , t) using the group test matrix H, the nonce N, and pseudorandom functions F and G with variable length input and fixed length output for the message M; and a step of outputting the MAC tag list. The present method is tied to a particular machine, namely a computer that receives the nonce N and the message M and outputs a MAC tag list.

According to a fifth aspect, there is provided a MAC tag list verification method including a step of receiving MAC tag list verification targets: a nonce N, a message M constituted by m items M[1], . . . , M[m], and a MAC tag list T=(T[1], . . . , T[t]), which is a list of t MAC values; a step of generating a t×m group test matrix H serving as combinatorial group testing parameters and outputting a test matrix expansion rule R constituted by a plurality of subsets of the row indices of the group test matrix H; a step of generating a verification MAC tag list T*=(T*[1], . . . , T*[t]) by generating a MAC value T*[j] corresponding to the j-th test (j=1, . . . , t) using the group test matrix H, the nonce N, and pseudorandom functions F and G with variable length input and fixed length output for the message M; a step of outputting the expanded MAC tag list exT and the expanded verification MAC tag list exT* by performing linear combination in each of the MAC tag list T and the verification MAC tag list T* corresponding to subsets of the row indices specified by the test matrix expansion rule R and using the MAC tag list T, the verification MAC tag list T*, and the test matrix expansion rule R; a step of comparing the expanded MAC tag list exT with the expanded verification MAC tag list exT*, verifying each item in the message M, identifying the position of any tampered item, and outputting a verification result; and a step of outputting the verification result. The present method is tied to a particular machine, namely a computer that receives the nonce N and the message M, verifies each item in the message M, identifies the position of any tampered item, and outputs the results as the verification result.

According to a sixth aspect, there is provided a computer program for implementing the functions of apparatuses constituting the MAC tag list generation apparatus, the MAC tag list verification apparatus, and the aggregate MAC verification system. Further, this program can be stored in a computer-readable (non-transitory) storage medium. That is, the present invention can be realized as a computer program product.

According to the present invention, it becomes possible to further improve the efficiency of message authentication that can obtain information not only on whether or not tampering has taken place, but also on the position of tampering.

DETAILED DESCRIPTION

First Example Embodiment

Next, a MAC tag list generation apparatus according to a first example embodiment of the present invention will be described in detail with reference to the drawings. Hereinafter, it is assumed that a length of one block is n bits, unless otherwise specified.

Figure 1:
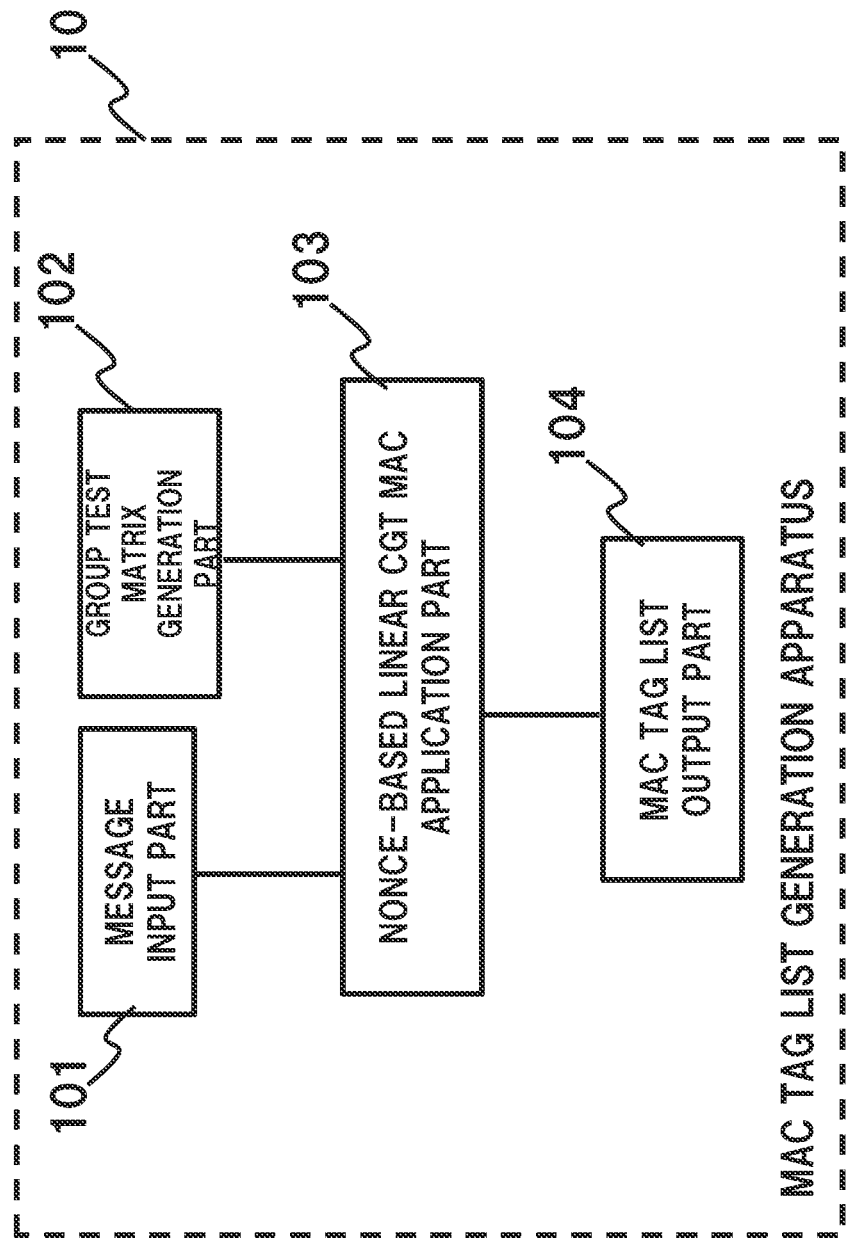
FIG. 1 is a diagram illustrating a configuration of a MAC tag list generation apparatus according to a first example embodiment of the present invention.

FIG. 1 is a diagram illustrating a configuration of the MAC tag list generation apparatus according to the first example embodiment of the present invention. Referring to FIG. 1, the MAC tag list generation apparatus 10 includes a message input part 101, a group test matrix generation part 102, a nonce-based linear CGT MAC application part 103, and a MAC tag list output part 104.

The message input part 101 is means for receiving a target message M and a nonce N. This message input part 101 can be realized by, for instance, a character input apparatus such as a keyboard or a communication interface that receives data from other apparatuses.

In the following description, it is assumed that the message M is constituted by m individual items M[1], . . . , and M[m]. These items may have respective lengths different to each other or two or more items may have a same length. For example, an item may be a content of a sector on a hard disk, an entry in a database, or a character in text information. Nonce N is a unique value that is updated for each process. For example, the nonce N may be generated by a counter or from time information. Nonce may be a random number when a length of the nonce sufficiently long.

The group test matrix generation part 102 generates a combinatorial group test for identifying a tampered position. More specifically, the group test matrix generation part 102 generates a t rows and m columns binary matrix H according to t which is the number of tests (i.e., the number of MACs) and d which is the maximum number d of tampered items that can be identified. This matrix H can be constructed arbitrarily, but for instance, the matrix H can be set as a basis over GF(2) of an existing d-disjunct matrix D. That is, the matrix H is said to be a matrix constituted by entire linearly independent row vectors of the d-disjunct matrix D or a matrix obtained by performing elementary row operations (sum of rows) on entire linearly independent row vectors.

Example 2

As an example, let's examine the following matrix.
[1 1 0 0]
[1 0 1 0]
[0 1 1 0]
[1 0 0 1]
[0 1 0 1]
[0 0 1 1]

The above [Example 2] is a 6-rows and 4-columns matrix which is 2-disjunct. Since 6>4, it is not suitable as a test matrix, i.e., a trivial method in which a tag is computed for each item is superior since it only needs four tags. The basis over GF(2) of the above matrix is as follows.
[1 0 0 1]
[0 1 0 1]
[0 0 1 1]

Therefore, two items can be identified with three tags.

Further, since it is known that there is no non-trivial (the number of rows<the number of columns) 2-disjunct matrix when m=4, and d=2, it is impossible to come up with a meaningful method according to NPL 3 [GAT05], NPL 4 [Min15], and NPL 8 [H518].

The nonce-based linear CGT MAC application part 103 generates t MAC tags using a nonce N, by a method specified by the t-rows and m-columns group test matrix H, for a message M=(M[1], . . . , M[m]).

MAC tags are generated using pseudorandom functions (PRF) F and G both having variable length input and fixed length output. For the sake of simplicity, the following description assumes that output lengths of the pseudorandom functions F and G are equal, but when they are different, the outputs of the pseudorandom functions F and G can be padded or shortened as necessary so that the lengths thereof will match.

The pseudorandom functions F and G may use different keys or the key may be generated from a single PRF using appropriate input domain separation.

Figure 10:
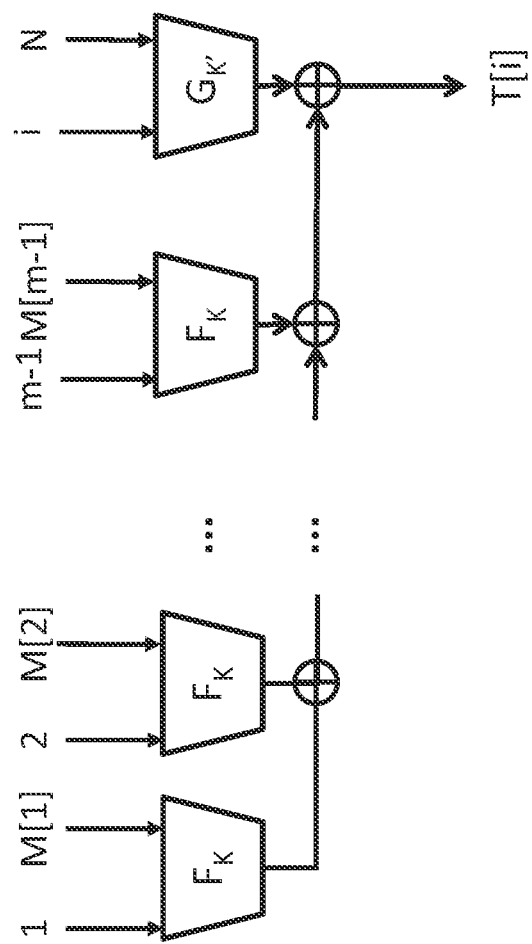
FIG. 10 is a diagram illustrating an example of a MAC function using pseudorandom functions F and G, each having variable length input.

FIG. 10 illustrates which item in the i-th row vector H[i] of the matrix H is included in MAC tag computation in the i-th test. More specifically, for an index j of any row where H[i] is 1, M[j] and j are concatenated and supplied to F to obtain F(M[j], j). For each j, the sum is taken over all F(M[j], j) (for instance, exclusive OR). The MAC value T[i] corresponding to the i-th test is obtained by summing the sum taken over all F(M[j], j) and G(N, i) obtained by supplying a result of concatenating N and i to G.

The nonce-based linear CGT MAC application part 103 performs the above computation for all i=1, . . . , t and generates a MAC tag list T=(T[1], . . . , T[t]).

Note that the pseudorandom functions F and G may be constituted by using standard block encryption such as the AES (Advanced Encryption Standard). Further, the pseudorandom functions F and G may be pseudorandom functions constituted by using a hash function such as one in SHA-2, for example, CMAC and HMAC (see NPLs 1 and 2).

Figure 11:
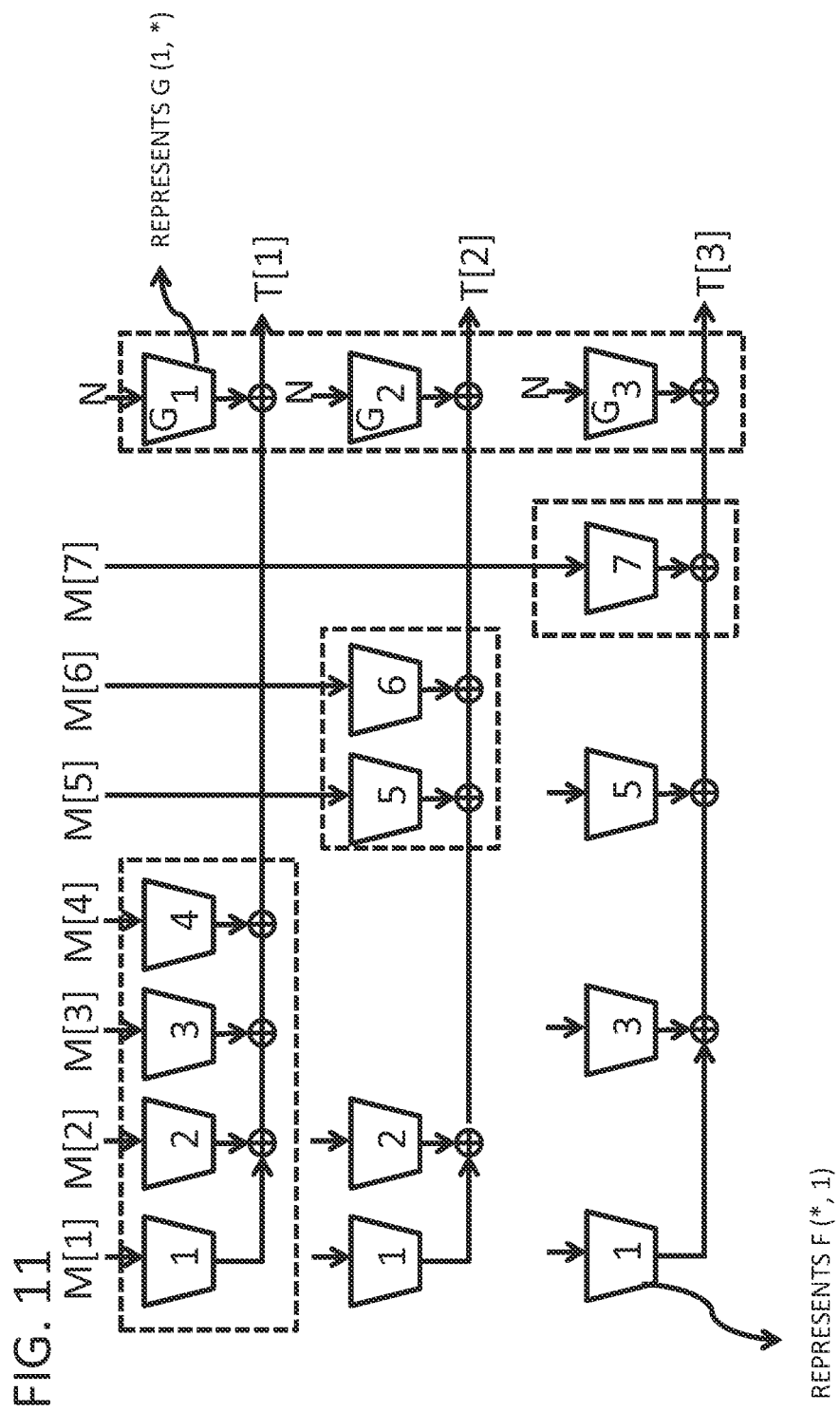
FIG. 11 is a diagram showing an example in which a MAC tag list is generated with m=7 items and t=3 tests.

Here, it is possible to compute each MAC tag with great efficiency by performing computation in parallel while sharing computation halfway results, as in NPL 4 [Min15], instead of individually computing each MAC tag for each test (see FIGS. 10 and 11). FIG. 11 illustrates an example in which a MAC tag list is generated, with m=7 items and t=3 tests. In the example of FIG. 11, a tag list with three tags can be computed by computing parts surrounded by dashed lines.

The linear group testing MAC with a nonce, as long as F and G are pseudorandom functions and the nonce is updated for each MAC generation process, makes it difficult for an attacker to predict a MAC tag for any message and hence makes it difficult to perform tampering.

The MAC tag list output part 104 outputs a MAC tag list outputted by the nonce-based linear CGT MAC application part 103 to a computer display and printer.

Figure 12:
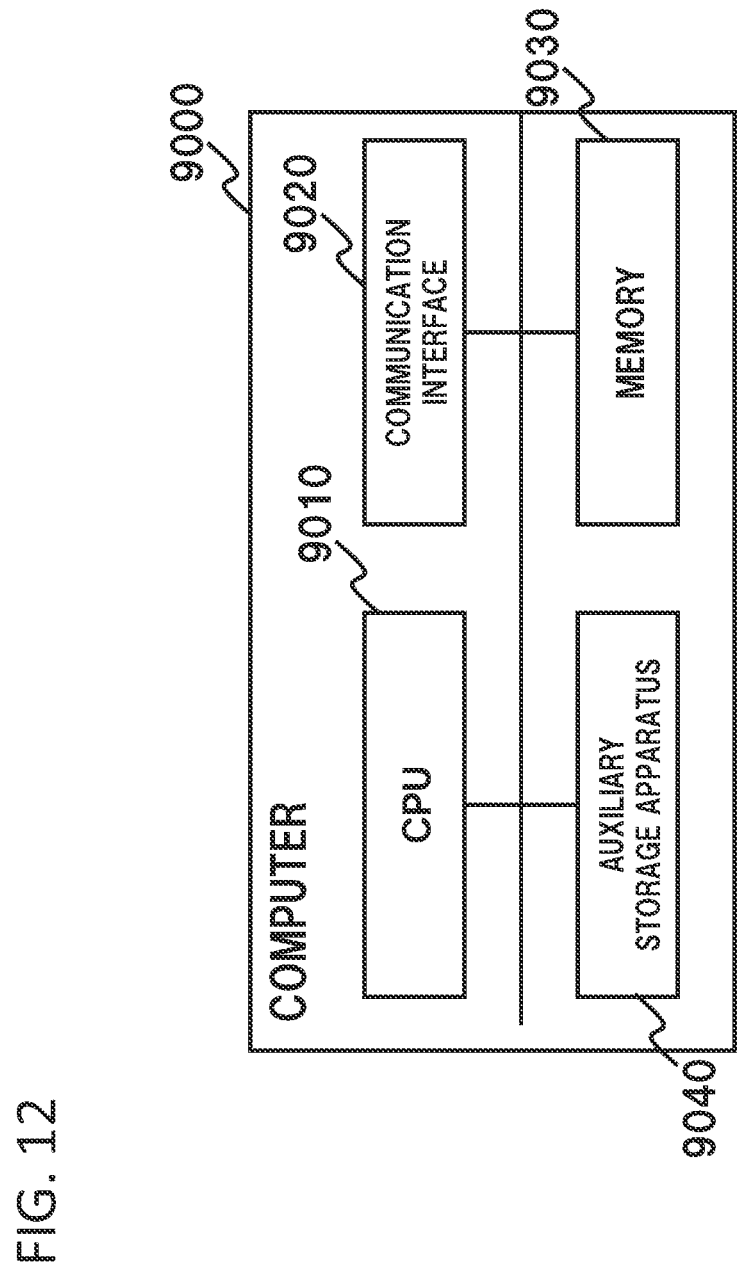
FIG. 12 is a diagram illustrating the configuration of a computer capable of implementing the present invention.

The MAC tag list generation apparatus 10 described above can be realized by a CPU, memory and disk. Each processing unit of the MAC tag list generation apparatus can be implemented by storing a program in the disk and running the program on the CPU (see FIG. 12).

Next, an overall operation of the first example embodiment will be described in detail with reference to a flowchart of FIG. 2. First, the message input part 101 receives a message M constituted by m items of MAC targets and a nonce N (step 1 in FIG. 2).

Figure 2:
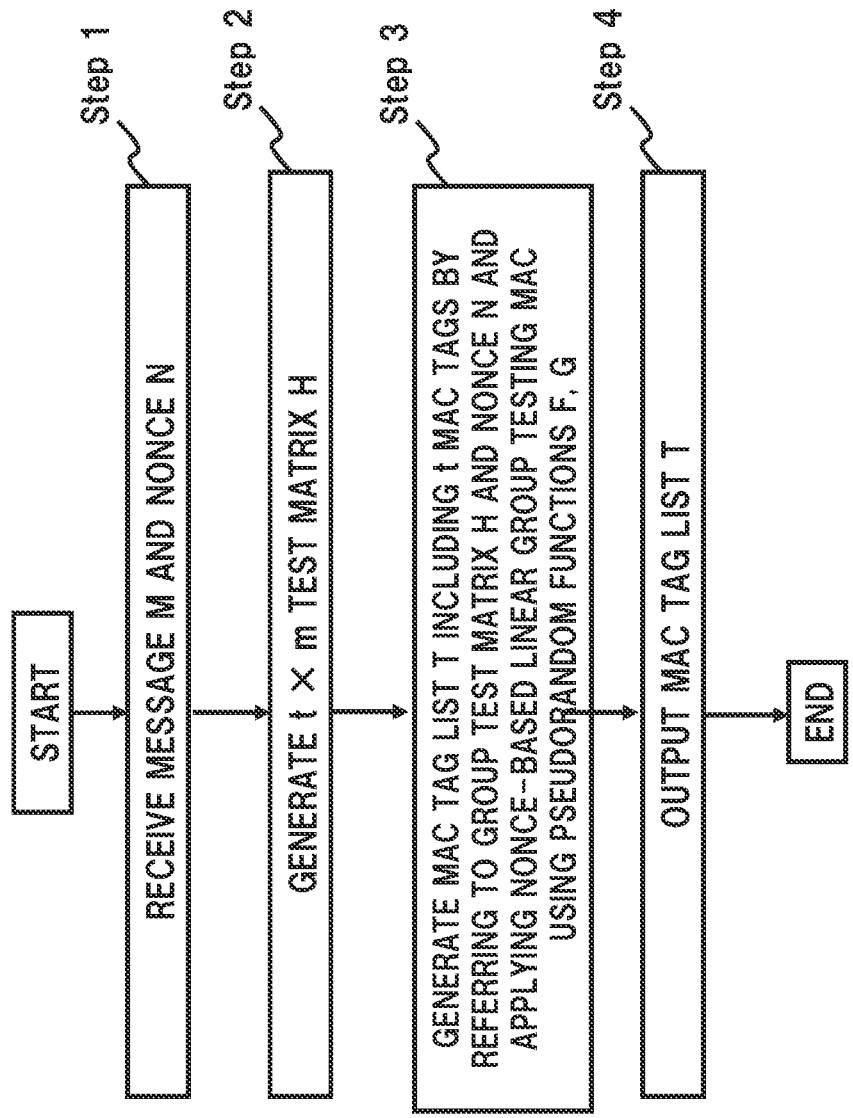
FIG. 2 is a flowchart illustrating the operation of the MAC tag list generation apparatus according to the first example embodiment of the present invention.

Next, the group test matrix generation part 102 generates the group test matrix H, which is a t-rows and m-columns binary matrix (step 2 in FIG. 2).

Next, the nonce-based linear CGT MAC application part 103 refers to the group test matrix H, applies, to M, the linear group testing MAC with the nonce using the pseudorandom functions F and G, and generates a MAC tag list T constituted by t MAC tags (step 3 in FIG. 2).

Finally, the MAC tag list output part 104 outputs the obtained MAC tag list T (step 4 in FIG. 2).

Figure 3:
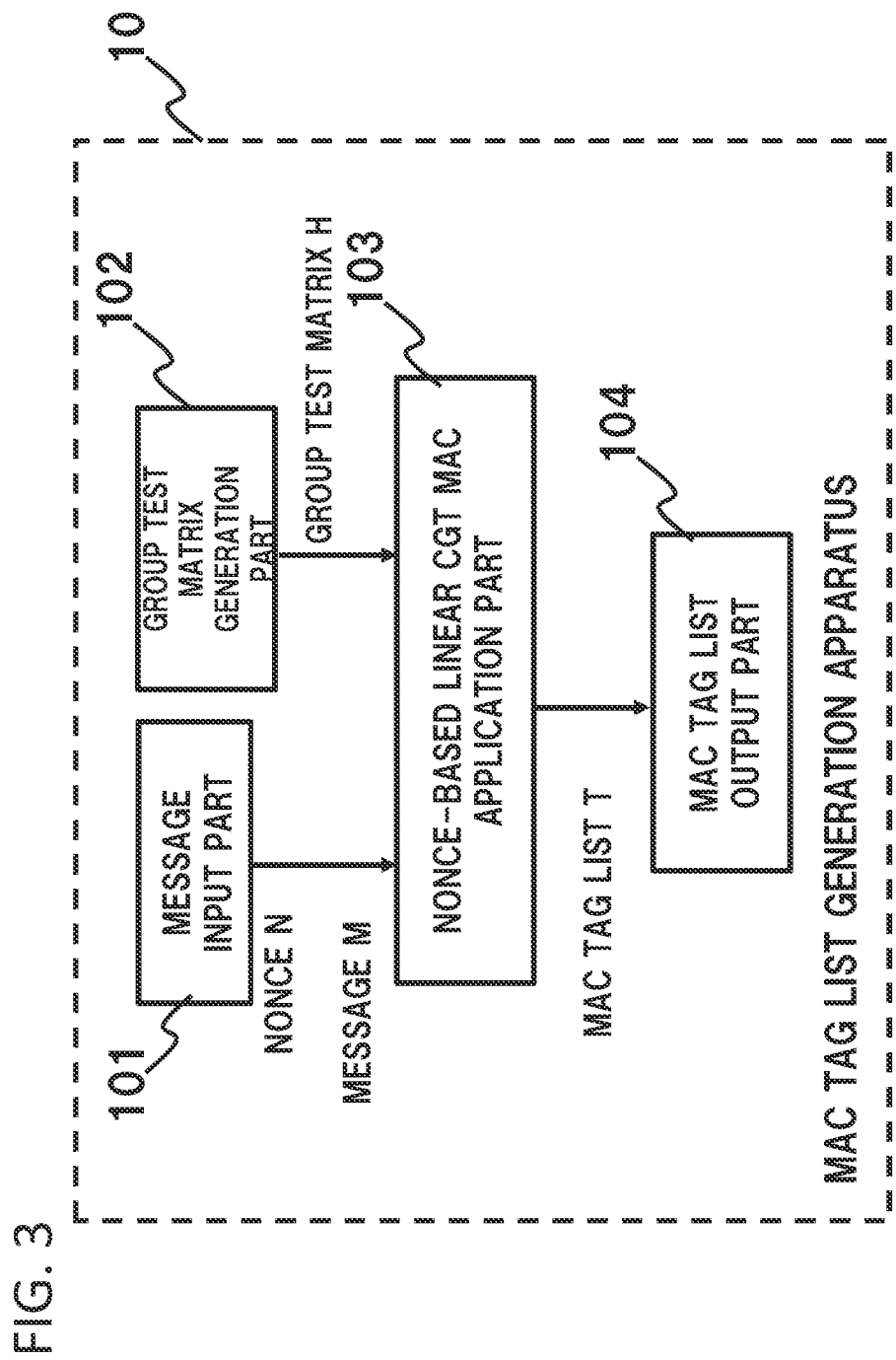
FIG. 3 is a diagram illustrating data flow between each part of the MAC tag list generation apparatus according to the first example embodiment of the present invention.

The MAC tag list generation apparatus 10 operating as described above can be summarized as below. The following describes a summary with reference to FIG. 3.

The message input part 101 receives a nonce N with a value not overlapping for each MAC generation process, and a message M=(M[1], . . . , M[m]) constituted by m items M[1], . . . , and M[m], to each of which MAC is to be applied.

For the number s of generated MACs, the group test matrix generation part 102 generates the t-rows and m-columns binary group test matrix H which are combinatorial group testing parameters.

The nonce N, the message M, and the binary group test matrix H are supplied to the nonce-based linear CGT MAC application part 103.

For the message M, the nonce-based linear CGT MAC application part 103 generates the MAC value T[i] corresponding to the i-th (i=1, . . . , t) test using the group test matrix H, the nonce N, and the pseudorandom functions F and G, each of which has a variable length input and a fixed length output. More specifically, for an index j (j=1, . . . , m)

of any column that is 1 in the i-th row of the group test matrix H, the nonce-based linear CGT MAC application part 103 supplies M[j] and the index j to the pseudorandom function F. Then, the nonce-based linear CGT MAC application part 103 obtains a MAC tag T[i] by adding a sum of all outputs obtained from the pseudorandom function F and a result of the pseudorandom function G to which the nonce N and i are supplied. The nonce-based linear CGT MAC application part 103 generates a MAC tag list T=(T[1], . . . , T[t]) by computing the MAC tag T[i] for all j=1, . . . , t (see FIG. 11).

Then, the MAC tag list output part 104 outputs the MAC tag list obtained by the nonce-based linear CGT MAC application part.

Effects of the first example embodiment as described above will be described together with a MAC tag list verification apparatus of a second example embodiment.

Second Example Embodiment

Figure 4:
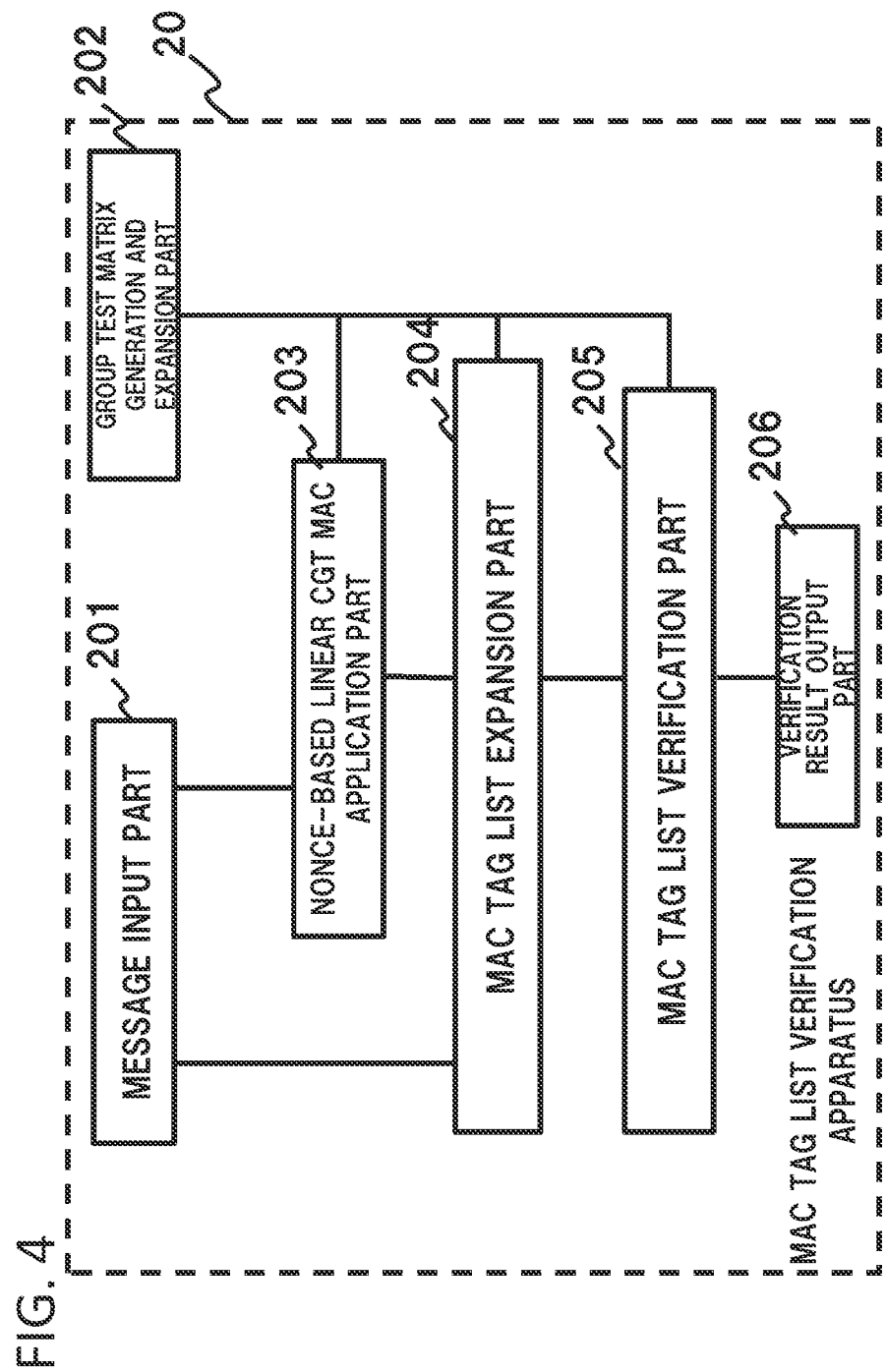
FIG. 4 is a diagram illustrating a configuration of a MAC tag list verification apparatus according to a second example embodiment of the present invention.

Next, as the second example embodiment, the MAC tag list verification apparatus which is paired with the first example embodiment of the present invention will be described in detail with reference to the drawings. FIG. 4 is a block diagram illustrating the configuration of the MAC tag list verification apparatus according to the second example embodiment. Referring to FIG. 4, a configuration is illustrated which includes a message input part 201, a group test matrix generation and expansion part 202, a nonce-based linear CGT MAC application part 203, a MAC tag list expansion part 204, a MAC tag list verification part 205, and a verification result output part 206.

The message input part 201 is means for receiving a target message M, a nonce N, and the MAC tag list T outputted by the MAC tag list generation apparatus 10 of the first example embodiment. The message input part 201 can be realized by, for instance, a character input apparatus such as a keyboard or a communication interface that receives data from other apparatus(es).

As in the first example embodiment, it is assumed that the message M is constituted by m individual items (M=M[1], . . . , M[m]). The nonce N is a unique value that is updated for each process, also as in the first example embodiment and may be generated by, for instance, a counter or from time information. The nonce may be a random number if it is sufficiently long.

The group test matrix generation and expansion part 202 generates a test matrix expansion rule R and a matrix H which is the same as the one generated by the group test matrix generation part 102 of the MAC tag list generation apparatus 10 according to the first example embodiment. The test matrix expansion rule R is a rule required to generate a matrix with the matrix H as a basis, but having more rows. More specifically, the test matrix expansion rule R is constituted by v elements (where v>t) that are subsets of row indices of the matrix H. The group test matrix generation and expansion part 202 corresponds to the group test matrix generation part.

The nonce-based linear CGT MAC application part 203 performs the same processing on the nonce N, the message M, and the group test matrix H as the nonce-based linear CGT MAC application part 103 of the MAC tag list generation apparatus 10 according to the first example embodiment, and outputs the results as a verification MAC tag list T*=(T*[1], . . . , T*[t]).

The MAC tag list expansion part 204 generates an expanded verification MAC tag list exT* by performing linear combination of the elements in the verification MAC tag list T* according to the test matrix expansion rule R, thereby expanding the list.

Here, the test matrix expansion rule R is constituted by v elements (where v>t) R[1], . . . , and R[v], and each R[i] is a subset of {1, . . . , t}.

At this time, the expanded verification MAC tag list is expressed as exT*=(exT*[1], . . . , exT*[v]) and for instance, if R[1]={1, 2, 4}, exT*[1]=T*[1]+T*[2]+T*[4].

Similarly, the MAC tag list expansion part 204 generates an expanded MAC tag list exT=(exT[1], . . . , exT[v]) by linearly combining elements in the MAC tag list T supplied from the message input part 201 also according to the test matrix expansion rule R, thereby expanding the list. Then, the MAC tag list expansion part 204 outputs the expanded MAC tag list exT and the expanded verification MAC tag list exT* to the MAC tag list verification part 205.

The MAC tag list verification part 205 performs verification of the message M by comparing the expanded verification MAC tag list exT* with the expanded MAC tag list exT, using the group test matrix H and the test matrix expansion rule R. More specifically, the MAC tag list verification part 205 determines whether or not tampering to the message M has been performed by comparing the expanded verification MAC tag list exT* with the expanded MAC tag list exT. Further, when it is determined that tampering has taken place, the MAC tag list verification part 205 identifies a tampered item and outputs an index of the tampered item to the verification result output part 206.

The following describes a mechanism of the message verification operation of the MAC tag list verification part 205.

First, with respect to a matrix obtained by expanding the group test matrix H using the test matrix expansion rule R, that is, R=(R[1], . . . , R[v]), let a v (v>t)-rows and m-columns matrix whose i-th row is a linear combination of the row of the matrix H specified by R[i] be an expanded test matrix exH.

Here, when the i-th row of the expanded test matrix exH is exH[i], $$exH[i]=XOR\_\{i:i \in R[i]\}H[i] \qquad \text{(Expression 3)}$$

(XOR_S denotes an exclusive OR for everything included in a set S). It is a matter of course that the group test matrix H is also used as a test, and in this case, exH includes H.

For example, this can be achieved as R[i]={i} for t=1, . . . , t.

At this time, for exT*=(exT*[1], . . . , exT*[v]) and exT=(exT[1], . . . , exT[v]), the difference therebetween is taken for each entry. Then a binary vector B=(B[1], . . . , B[v]) is created by setting the value to 0 when the difference is zero and to 1 when the difference is non-zero, and the result is outputted based on a predetermined procedure performed on B using the expanded test matrix exH.

More specifically, when all the entries in B are 0, it is determined that no tampering has taken place. In all other cases, it is determined that at least one item is tampered, and in order to identify a tampered item, for all i=1, . . . , v such that B[i]=0, the i-th vector V=(V[1], . . . , V[m]) of exH is taken out and it is determined that M[j] is not tampered for all j=1, . . . , m such that V[j]=1.

The MAC tag list verification part 205 performs the above processes, determines that all items that are not determined to be untampered to be tampered, and outputs all indices thereof. When tampering did not take place, no index is outputted.

In group testing, this procedure corresponds to a process called naive decoder with the expanded test matrix exH set as a test matrix.

When the expanded test matrix exH is d-disjunct, the above procedure can identify all tampered items when the number of such items is not more than d.

Further, since there does not occur such a case where an item determined to be untampered is actually tampered as described in NPL 5 [CJS09], there is an effect of being able to generally narrow down a range in which tampering might have taken place even when the test matrix is not d-disjunct for a desired d.

The verification result output part 206 outputs the index information of tampered items outputted by the MAC tag list verification part 205 to a computer display and printer.

The MAC tag list verification apparatus 20 described above can be realized by a CPU, memory and disk. Each processing unit of the MAC tag list verification apparatus can be implemented by storing a program in the disk and running the program on the CPU (see FIG. 12).

Next, the overall operation of the second example embodiment will be described in detail with reference to a flowchart in FIG. 5. First, the message input part 201 receives the target message M constituted by m items, the nonce N, and the MAC tag list T (step 11 in FIG. 5).

Figure 5:
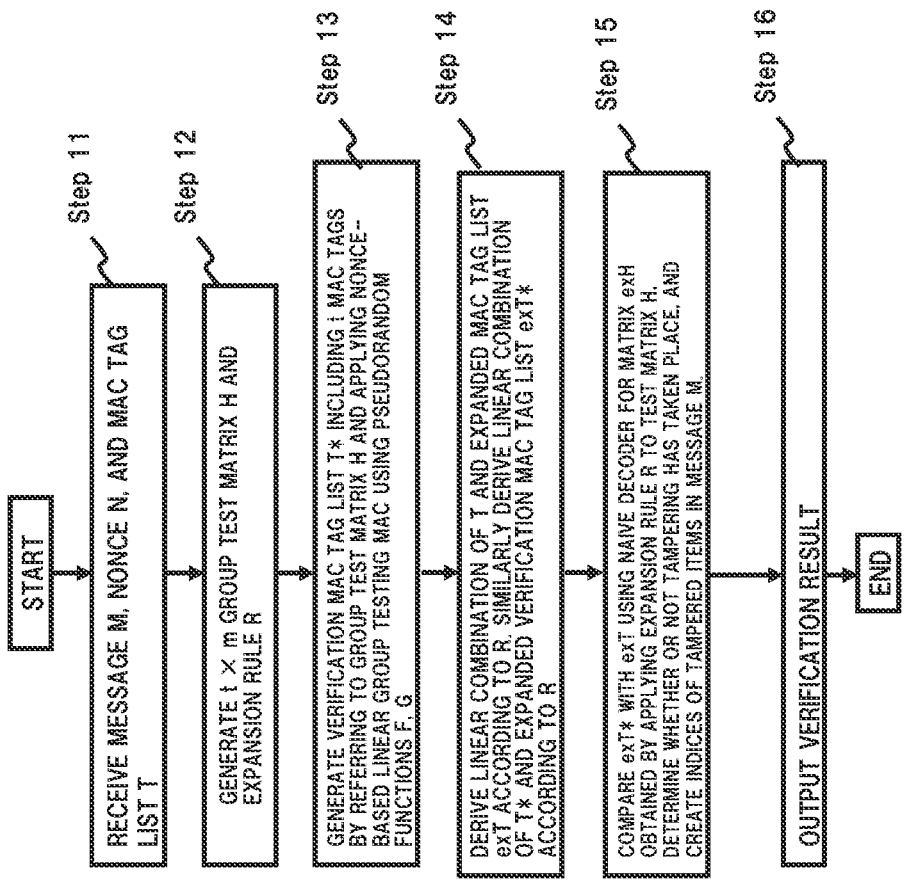
FIG. 5 is a flowchart illustrating an operation of the MAC tag list verification apparatus according to the second example embodiment of the present invention.

Next, the group test matrix generation and expansion part 202 generates the group test matrix H, which is a t-rows and m-columns binary matrix, and the test matrix expansion rule R (step 12 in FIG. 5).

Next, the nonce-based linear CGT MAC application part 203 refers to the group test matrix H, applies, to the message M, the linear group testing MAC with the nonce using the pseudorandom functions F and G, and generates the verification MAC tag list T* constituted by t MAC tags (step 13 in FIG. 5).

Next, the MAC tag list expansion part 204 expands both the MAC tag list T and the verification MAC tag list T* according to the test matrix expansion rule R and generates the expanded MAC tag list exT and the expanded verification MAC tag list exT* (step 14 in FIG. 5).

Next, the MAC tag list verification part 205 compares the expanded MAC tag list exT with the expanded verification MAC tag list exT*, using the expanded test matrix exH obtained by expanding a row in the group test matrix H according to the test matrix expansion rule R. Then, the MAC tag list verification part 205 outputs an index set of tampered items in the message M (step 15 in FIG. 5).

Finally, the verification result output part 206 outputs the index set of tampered items detected by the MAC tag list verification part 205 as a verification result (step 16 in FIG. 5).

Figure 6:
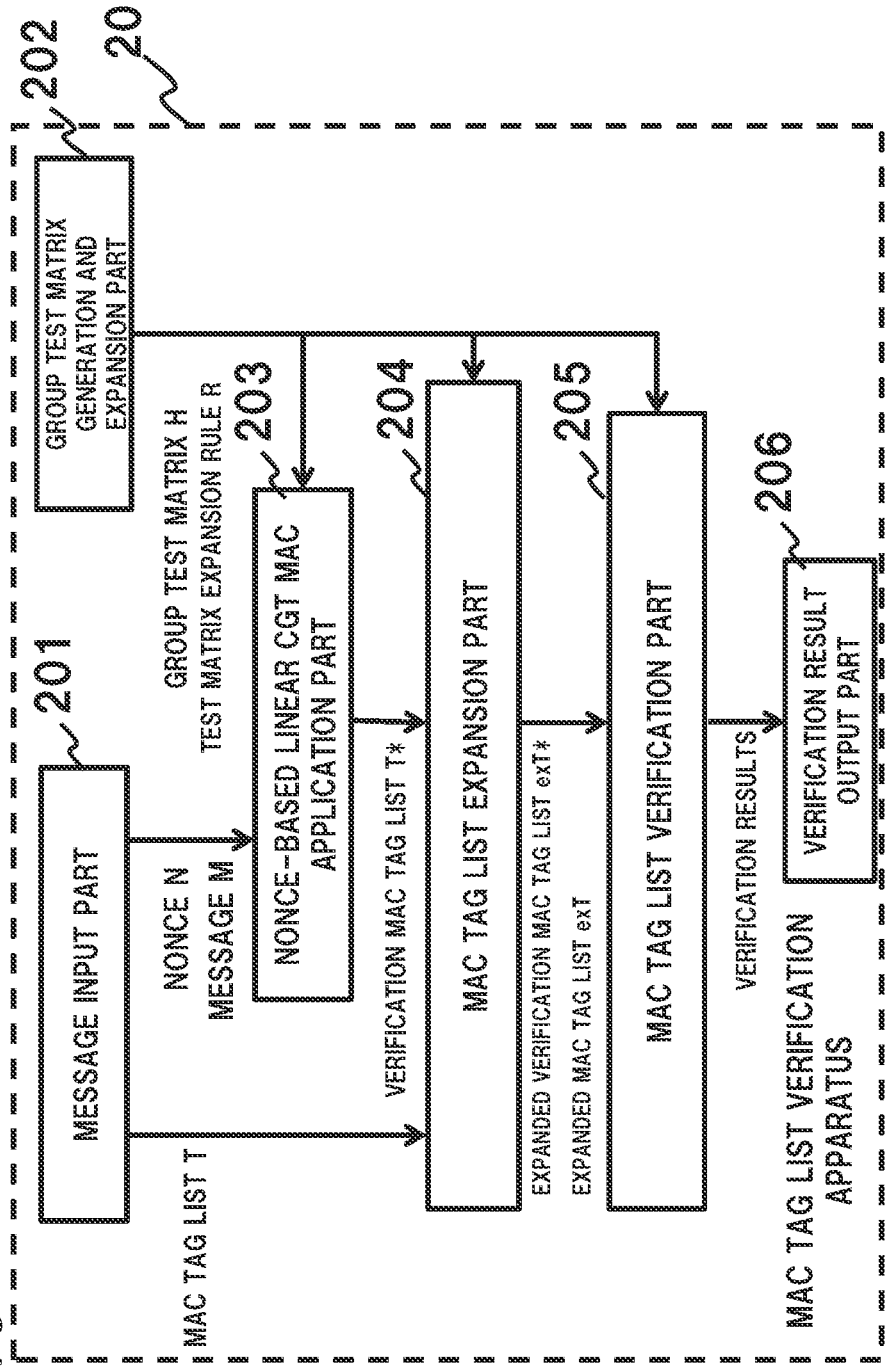
FIG. 6 is a diagram illustrating data flow between each part of the MAC tag list verification apparatus according to the second example embodiment of the present invention.

The MAC tag list verification apparatus 20 operating as described above can be summarized as follows. The summary will be given with reference to FIG. 6.

The message input part 201 receives the message M=(M[1], ..., M[m]) constituted by m items, which is the MAC tag list verification target, the nonce N, and the MAC tag list T=(T[1], ..., T[t]), which is a list of t MACs.

The group test matrix generation and expansion part 202 generates the t-rows and m-columns binary group test matrix H. Further, the group test matrix generation and expansion part 202 outputs the test matrix expansion rule R constituted by v elements (where v>t) R[i] that are subsets of the row indices of the group test matrix H. The group test matrix generation and expansion part 202 includes the group test matrix generation part and a group test matrix expansion part.

For the message M, the nonce-based linear CGT MAC application part 203 generates the verification MAC tag list T*=(T*[1], ..., T*[t]), using the group test matrix H, the nonce N, and the pseudorandom functions F and G with variable length input and fixed length output. More specifically, for an index i of any row that is 1 in the j-th column of the group test matrix H, the nonce-based linear CGT MAC application part 203 supplies the i-th item M[i] and the index i to the pseudorandom function F and sums all the obtained outputs. Further, the nonce-based linear CGT MAC application part 203 adds this sum and the result of supplying the nonce N to the pseudorandom function G, setting the obtained output as a verification MAC value T*[i] corresponding to the j-th test. The nonce-based linear CGT MAC application part 203 performs this for all j=1, ..., t and generates the verification MAC tag list T*=(T*[1], ..., T*[t]).

Using the MAC tag list T, the verification MAC tag list T*, and the test matrix expansion rule R, the MAC tag list expansion part 204 performs linear combination in T and T* corresponding to subsets of the row indices specified by the test matrix expansion rule R and outputs the expanded MAC tag list exT and the expanded verification MAC tag list exT*.

The MAC tag list verification part 205 compares the expanded MAC tag list exT with the expanded verification MAC tag list exT* to verify each item in the message M and identify a position of any tampered item, and outputs a verification result.

Then, the verification result output part 206 outputs the verification result outputted from the MAC tag list verification part 205.

According to the first and the second example embodiments described above, in message authentication that identifies the position of a tampered item using combinatorial group testing, the effect of reducing the number of tags can be obtained, compared with the techniques of NPL 3 [GAT05] and NPL 4 [Min15]. The reason for this is that, whereas only t tags generated according to a t-rows and m-columns test matrix are used to identify tampering in NPL 3 [GAT05] and NPL 4 [Min15], a linear combination of tags is also used for tampering identification in the first and the second example embodiments.

Further, since tags are outputs obtained by applying a pseudorandom function to an input message, a linear combination of tags does not provide any useful information in NPL 3 [GAT05] and NPL 4 [Min15], however, tags have some degree of linearity due to the use of a nonce-based parallel-executable MAC in the first and the second example embodiments. Therefore, it is possible to use the sum of tags as a new test according to the first and the second example embodiments.

For example, when the first row of H is (1100 ... 0) and the second row is (01100 ... 0) in the first example embodiment, the corresponding tags are as follows.

$$T[1]=F(M[1],1)+F(M[2],2)+G(N,1)$$

$$T[2]=F(M[2],2)+F(M[3],3)+G(N,2)$$

("+" denotes a bitwise exclusive OR.)

Here, since $$T[1]+T[2]=F(M[1],1)+F(M[3],3)+G(N,1)+G(N,2),$$

T[1]+T[2] functions as a tag that verifies whether or not m(M[1], M[3]) is tampered.

This is information that cannot be obtained in tampering identification using only T[1] and T[2]. For example, when both T[1] and T[2] cannot be verified, leaving two possibilities that either M[2] is tampered or that M[1] and M[3] are tampered, no further identification is possible with only T[1] and T[2]. Then, T[3]=T[1]+T[2] is obtained and if the verification of T[3] is okay, one can identify M[2] as the tampered item.

Further, the test matrix expansion rule R specifies which tags should be summed and is a set having subsets of the row indices of the group test matrix H as elements. In the example above, there is a set {1, 2} as an element of the test matrix expansion rule R.

More generally, when a certain group test matrix H is used in NPL 3 [GAT05] and NPL 4 [Min15], a basis H_b over GF(2) of the group test matrix H can be used in the first and the second example embodiments.

The number of rows in H_b is the number of linearly independent rows in the original group test matrix H (i.e., the rank of the matrix), and since it matches the original number of rows at worst, reduction of the number of rows can be expected (thereby reducing the number of elements in a tag list transmitted).

Further, since the basis H_b over GF(2) of the group test matrix H can, in effect, execute the same test as the group test matrix H, the ability thereof to identify a tampered item is equivalent to the methods of NPL 3 [GAT05] and NPL 4 [Min15] using the group test matrix H.

Further, the tag generation functions used in the first and the second example embodiments can be regarded as variants of an XOR MAC described in NPL 9 [BGR95]. NPL 9 [BGR95], however, proposes a single MAC function and does not discuss the use of group testing or tampered item identification.

Figure 7:
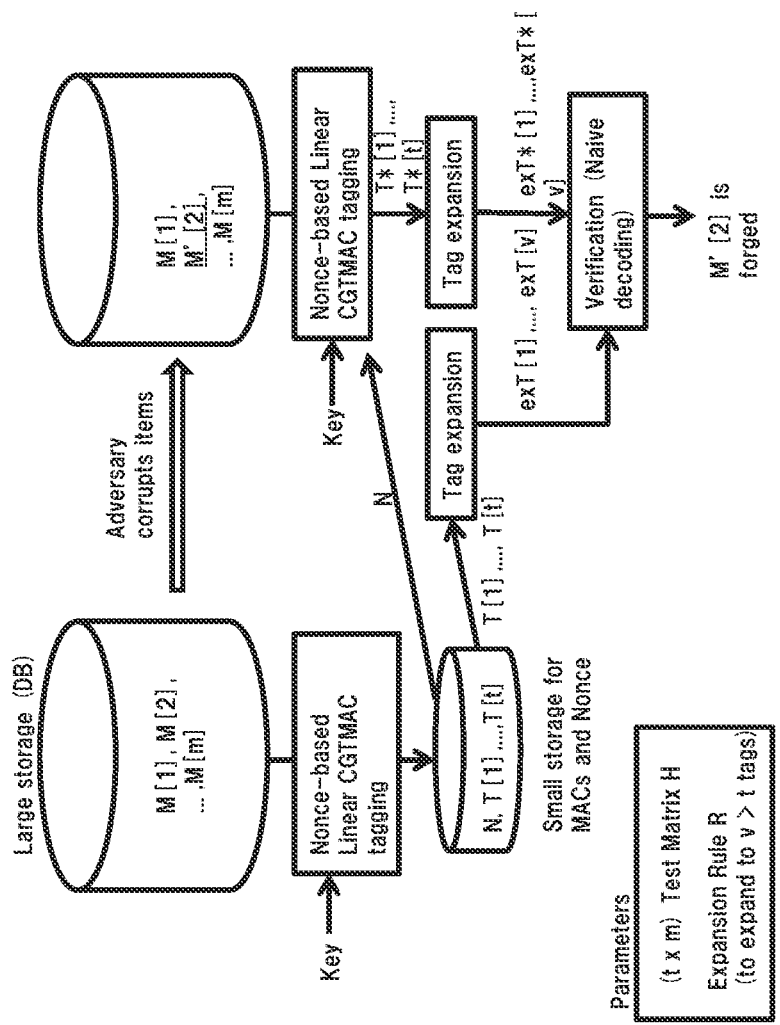
FIG. 7 is a diagram illustrating an example in which configurations of the first and the second example embodiments of the present invention are applied to a storage system.

The configurations of the first and the second example embodiments described above can be suitably applied to a storage system shown in FIG. 7. That is, a configuration, in which the nonce-based linear CGT MAC application part generates a MAC tag list for a message M stored in a large storage database, corresponds to the MAC tag list generation apparatus 10 of the first example embodiment. Then a configuration, in which the nonce-based linear CGT MAC application part creates the verification MAC tag list T* for the MAC tag list, creates the expanded MAC tag list exT and the expanded verification MAC tag list exT* using the test matrix expansion rule R for the MAC tag list T and the verification MAC tag list T*, and identifies whether or not tampering has taken place or identify a tampered location, corresponds to the MAC tag list verification apparatus 20 of the second example embodiment.

Third Example Embodiment

Figure 8:
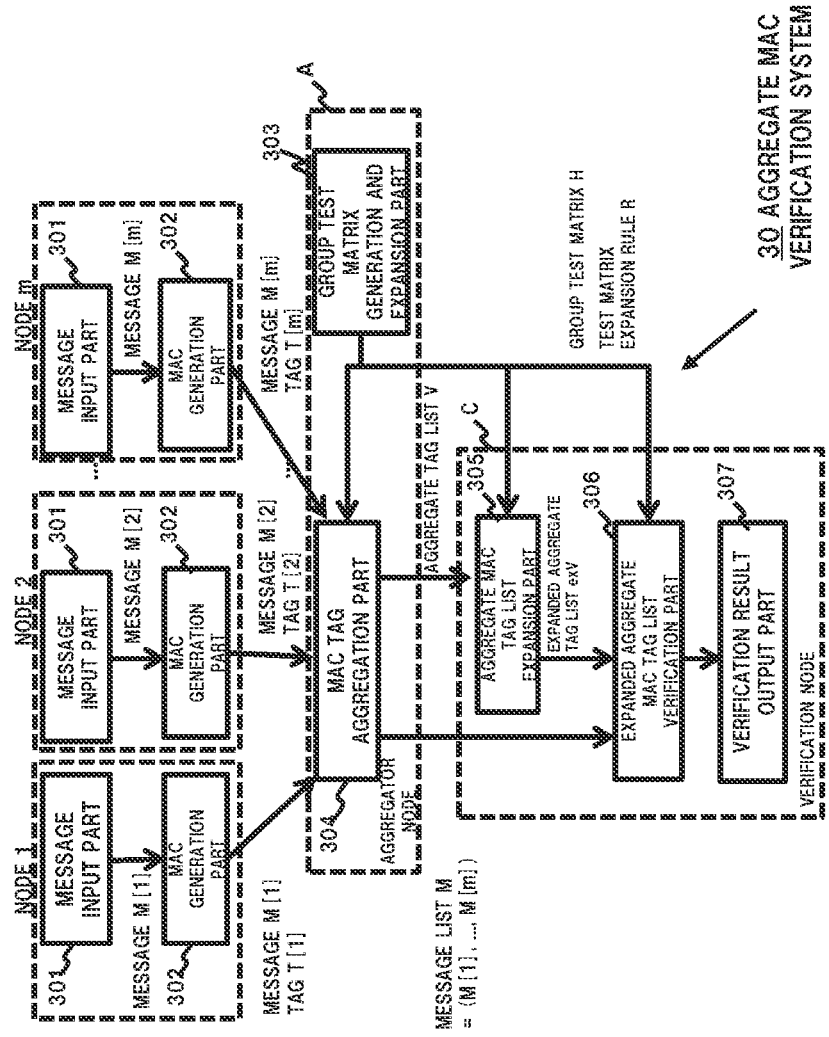
FIG. 8 is a diagram illustrating a configuration of an aggregate MAC verification system according to a third example embodiment of the present invention.

Next, with reference to the drawings, the following describes in detail a third example embodiment with a configuration supposed to verify messages and tags received from a plurality of nodes. FIG. 8 is a block diagram illustrating the configuration of an aggregate MAC verification system according to the third example embodiment of the present invention.

Referring to FIG. 8, a configuration is illustrated in which an aggregator node A that receives messages and tags from m nodes and a verification node C that receives a message list M and an aggregate tag list V from the aggregator node A are connected.

Each of the nodes 1 to m includes a message input part 301 and a MAC generation part 302.

The aggregator node A includes a group test matrix generation and expansion part 303 and a MAC tag aggregation part 304.

The verification node C includes an aggregate MAC tag list expansion part 305, an expanded aggregate MAC tag list verification part 306, and a verification result output part 307.

The message input part 301 receives a target message M[i] on the i-th node (i=1, ..., m) in the aggregate MAC. For example, the message input part 301 can be realized by a character input apparatus such as a keyboard or a communication interface that receives data from other apparatuses.

The MAC generation part 302 obtains a MAC tag T[i] for the message M[i] of the i-th node (i=1, ..., m) and outputs a message-tag pair (M[i], T[i]). The MAC generation part 302 can be implemented by using CMAC or HMAC. A MAC key may be independent for each node or dependent.

The group test matrix generation and expansion part 303 includes a group test matrix generation part and a group test matrix expansion part. That is, like the group test matrix generation and expansion part 202 of the MAC tag list verification apparatus 20 according to the second example embodiment, the group test matrix generation and expansion part 303 outputs a t-rows and m-columns group test matrix H and a test matrix expansion rule R. As in the second example embodiment, this test matrix expansion rule R is a rule that specifies how to expand the rows of the group test matrix H (expanding from t to v rows (where v>t)). It may suffice that these outputs are outputted once at the beginning, which may be performed by the aggregator node A and the results may be provided to the verification node C. Further, the group test matrix generation and expansion part 303 may be provided in the verification node C, which may supply the group test matrix H and the test matrix expansion rule R to the aggregator node A. Alternatively, the reverse configuration may be adopted.

The MAC tag aggregation part 304 in the aggregator node aggregates tags, with regards to entire outputs from m nodes (M[1], T[2]), ..., and (M[m], T[m]), according to the group test matrix H to obtain the aggregate tag list V=(V[1], ..., V[t]). Then, the MAC tag aggregation part 304 outputs, to the verification node C, the aggregate tag list V along with the message list (M[1], ..., M[m]). V[i] is obtained by summing all T[j] for a column index j where an i-th row of the group test matrix H is 1.

The aggregate MAC tag list expansion part 305 performs linear combination in the aggregate tag list V according to the test matrix expansion rule R to output an expanded aggregate tag list exV=(exV[1], ..., exV[v]) (v>t).

The expanded aggregate MAC tag list verification part 306 obtains verification tags T*[1], ..., T*[m], by using the key of each node for the message list M=(M[1], ..., M[m]) to generate a verification MAC tag list T*=(T*[1], ..., T*[m]). Next, the expanded aggregate MAC tag list verification part 306 obtains an expanded verification aggregate tag list exV*=(exV*[1], ..., exV*[v]), by using the group test matrix H and the test matrix expansion rule R on T*.

Next, like the MAC tag list verification part 205 of the second example embodiment, the expanded aggregate MAC tag list verification part 306 performs comparison between the expanded aggregate tag list exV and the expanded verification aggregate tag list exV*, by using the group test matrix H and the test matrix expansion rule R to output an index set of tampered nodes.

The verification result output part 307 outputs the index set of tampered nodes outputted by the expanded aggregate MAC tag list verification part 306 to a display as the verification result.

The nodes constituting the aggregate MAC verification system 30 as described above can be realized by a CPU, memory and disk. Each processing unit of the aggregate MAC verification system 30 can be implemented by storing a program in the disk and running the program on the CPU (see FIG. 12).

Next, the overall operation of the third example embodiment will be described in detail with reference to a flowchart in FIG. 9. First, the message input part 301 of each node $i=1, \ldots, m$ receives the target message M[i], and the MAC generation part 302 obtains the MAC tag T[i], which is outputted to the aggregator node A (step 21 in FIG. 9).

Figure 9:
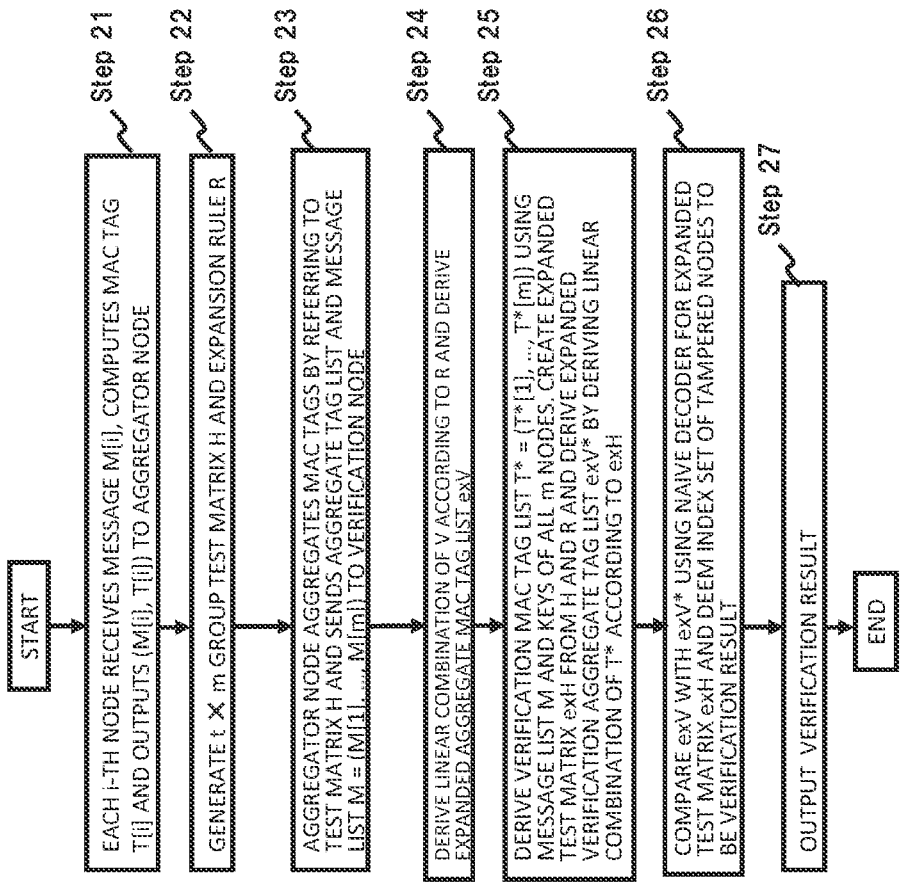
FIG. 9 is a flowchart illustrating an operation of the aggregate MAC verification system according to the third example embodiment of the present invention.

Next, the group test matrix generation and expansion part 303 generates the group test matrix H, which is a t-rows and m-columns binary matrix, and the test matrix expansion rule R (step 22 in FIG. 9).

Next, the MAC tag aggregation part 304 of the aggregator node A aggregates MAC tags with regards to the received (M[1], T[1]), . . . , (M[m], T[m]), according to the group test matrix H. Then, the MAC tag aggregation part 304 outputs the aggregate tag list V=(V[1], . . . , V[t]) obtained by aggregating MAC tags and the message list M=(M[1], . . . , M[m]) to the verification node C (step 23 in FIG. 9).

Next, the verification node C expands the received aggregate tag list V, by using the test matrix expansion rule R to obtain the expanded aggregate tag list exV (step 24 in FIG. 9).

Further, the verification node C obtains the verification MAC tag list T*=(T*[1], . . . , T*[m]), using the received message list M and the key of each node. Then, the verification node C generates the expanded test matrix exH by expanding rows of the group test matrix H according to the test matrix expansion rule R and obtains the expanded verification aggregate tag list exV* by calculating a linear combination of the verification MAC tag list T* according to the expanded test matrix exH (step 25 in FIG. 9).

Further, the verification node C performs comparison between the expanded aggregate tag list exV and the expanded verification aggregate tag list exV*, with the naive decoder which uses the expanded test matrix exH, identifies a tampered node(s), and sets an index set of the tampered node(s) as a verification result (step 26 in FIG. 9).

Finally, the verification node C outputs the verification result (step 27 in FIG. 9).

The aggregate MAC verification system 30 which operates as described above can be summarized as follows. The summary will be given with reference to FIG. 8.

The message input part 301 of the i-th node independently receives M[i] as a target message.

The MAC generation part 302 of the i-th node $(i=1, \ldots, m)$ obtains a single MAC tag T[i] for M[i] and outputs the tag.

The group test matrix generation and expansion part 303 outputs the t-rows and m-columns group test matrix H and the test matrix expansion rule R.

The MAC tag aggregation part 304 of the aggregator node A receives m message-tag pairs (M[1], T[1]), . . . , (M[m], T[m]) and aggregates the tags according to the group test matrix H. Then, the MAC tag aggregation part 304 outputs the aggregate tag list V=(V[1], . . . , V[t]) constituted by t aggregate tags and the message list M=(M[1], . . . , M[m]).

The aggregate MAC tag list expansion part 305 of the verification node C obtains a linear combination of the elements in the aggregate tag list V according to the test matrix expansion rule R and outputs the expanded aggregate tag list exV.

The expanded aggregate MAC tag list verification part 306 of the verification node C verifies the message list M using the message list M=(M[1], . . . , M[m]), the expanded aggregate tag list exV, and the test matrix expansion rule R, identifies a tampered node(s), and outputs the tampered node(s) as a verification result.

The verification result output part 307 of the verification node C outputs the verification result obtained by the expanded aggregate MAC tag list verification part 306.

Effects of the third example embodiment described above are the same as those of the first and the second example embodiments. In NPL 8 [HS18], the aggregator node A obtains an aggregate tag list according to a certain test matrix A. In the present example embodiment, the aggregator node A aggregates tags according to a basis matrix Hb of the group test matrix H and sends tags to the verification node C. Therefore, the verification node C is able to sum the aggregate tags according to the test matrix expansion rule R and obtain the aggregate tags corresponding to the group test matrix H. As a result, in the present example embodiment, it is possible to have identification capability with regards to identification of a tampered node(s) in an aggregate MAC scheme, equal to or better than that of NPL 8 [HS18], while reducing a transmission amount.

Fourth Example Embodiment

The following describes a fourth example embodiment in which the group test matrix H of the first to the third example embodiments is modified.

Macula's matrix shown in [Example 2] is generally generated as follows.

For positive integers a and b, let (a, b)=a!/(a−b)!b! be the number when selecting b items from a items, and let ((a, b)) be an entirety of subsets having a size of b out of a set $\{1, 2, \ldots, a\}$.

At this time, Macula's matrix is a (n, d)×(n, k) matrix for parameters (n, k, d), and after associating column and row indices with the elements of ((n, d)) and ((n, k)) in an appropriate order, when an element D of a certain ((n, d)) is included in an element K of ((n, k)), the (D, K) entry of the matrix is 1 and the other entries are 0.

As described in NPL 10 [M96], Macula's matrix is d-disjunct.

The matrix shown in [Example 2]

[1 1 0 0]
[1 0 1 0]
[0 1 1 0]
[1 0 0 1]
[0 1 0 1]
[0 0 1 1]

corresponds to the parameters of Macula's matrix (n=4, k=3, d=2), and is therefore 2-disjunct.

A basis over GF(2) of the matrix becomes a group test matrix H, but it is not unique and any of the following can be used.

[1 0 0 1]
[0 1 0 1]
[0 0 1 1]

and

[1 1 0 0]
[0 1 1 0]
[0 0 1 1]

As described, even when Macula's matrix has more rows than columns, depending on the parameters, i.e., it is meaningless as a d-disjunct matrix as is, it is possible to construct a test matrix with the number of rows less than the number of columns by using a basis over GF(2) thereof, as in [Example 2].

The fourth example embodiment can be summarized as follows. The group test matrix generation part 102 of the MAC tag list generation apparatus 10, the group test matrix generation and expansion part 202 of the MAC tag list verification apparatus 20, or the group test matrix generation and expansion part 303 of the third example embodiment generates the group test matrix H defined as follows.

The t-rows and m-columns group test matrix H is composed by Macula's matrix having positive integer parameters (n, k, d). That is, with regards to positive integers a and b, let (a, b)=a!/(a−b)!b! be the number when selecting b items from a items, and let ((a, b)) be entire subsets each having a size of b out of a set $\{1, 2, \ldots, a\}$. This group test matrix H is a (n, d)×(n, k) binary matrix constituted by a basis over the finite field GF(2) of such a matrix that, after associating the column and row indices with the elements of ((n, d)) and ((n, k)) in an appropriate order, when an element D of a certain ((n, d)) is included in an element K of ((n, k)), the (D, K) entry of the matrix is 1 and the other entries are 0.

Fifth Example Embodiment

With reference to the drawings, the following describes a fifth example embodiment in which the group test matrix H of the first to the third example embodiments described above is modified.

The t-rows and m-columns group test matrix H in the fifth example embodiment is as follows. For an integer r, let m be $2^r-1$, and the matrix exH obtained by expanding the group test matrix H using the test matrix expansion rule R is a matrix (denoted as "modHad(r)") obtained by deleting the first row and the first column from an (m+1)-rows and (m+1)-columns Hadamard matrix Had(r) and, of entries 1 and −1, replacing −1 with 0.

The group test matrix H may be obtained by selecting a submatrix (generally, there are a plurality of them) that is a basis of modHad(r), and the test matrix expansion rule R is selected so that the sum of rows of this submatrix forms modHad(r). At this time, t is r+1.

Example 3

For example, when r=3, Had(r) is as follows.
[1 1 1 1 1 1 1 1]
[1 −1 1 −1 1 −1 1 −1]
[1 1 −1 −1 1 1 −1 −1]
[1 −1 −1 1 1 −1 −1 1]
[1 1 1 1 −1 −1 −1 −1]
[1 −1 1 −1 −1 1 −1 1]
[1 1 −1 −1 −1 −1 1 1]
[1 −1 −1 1 −1 1 1 −1]
modHad(r), i.e., exH is as follows.
[0 1 0 1 0 1 0]
[1 0 0 1 1 0 0]
[0 0 1 1 0 0 1]
[1 1 1 0 0 0 0]
[0 1 0 0 1 0 1]
[1 0 0 0 0 1 1]
[0 0 1 0 1 1 0]

The group test matrix H is one of these basis, as follows.
[0 1 0 1 0 1 0]
[1 0 0 1 1 0 0]
[0 0 1 1 0 0 1]
[1 1 1 0 0 0 0]

The corresponding test matrix expansion rule R is ($\{1\}, \{2\}, \{3\}, \{4\}, \{2, 3, 4\}, \{1, 3, 4\}, \{1, 2, 4\}$).

This expanded test matrix exH is 2-disjunct for any r>1, and therefore it is possible to identify two tampered items with r+1=log m+1 tags.

As described above, according to the present example embodiment, it becomes possible to identify up to two tampered items using approximately log m tests, thus providing greater efficiency than the method using a 2-disjunct matrix itself as the group test matrix H.

The fifth example embodiment is summarized as follows. The group test matrix generation part 102 of the MAC tag list generation apparatus 10, the group test matrix generation and expansion part 202 of the MAC tag list verification apparatus 20, or the group test matrix generation and expansion part 303 of the third example embodiment generates the group test matrix H defined as follows.

An m-rows and m+1-columns binary matrix modHad(r) satisfying $m=2^r-1$ and t=r for an integer r>1 is obtained by deleting the first row and the first column from an m+1×m+1 Hadamard matrix Had(r) and, out of elements −1 and 1 of the Hadamard matrix, further replacing −1 with 0, the group test matrix H is composed by a basis over the finite field GF(2) of this matrix, and the test matrix expansion rule R is such that modHad(r) is obtained when the rows of the group test matrix H are expanded according to the test matrix expansion rule R.

Sixth Example Embodiment

The following describes a sixth example embodiment in which the group test matrix H of the first to the third example embodiments described above is modified.

The group test matrix H in the sixth example embodiment is a submatrix constituted by t linearly independent row vectors of a square matrix P with the number of rows and the number of columns being $2^{(2s)}+2^s+1$, where s is a positive integer. It is assumed that the square matrix P is an incidence matrix determined by all points and straight lines in a two-dimensional projective space having a finite field $GF(2^s)$ as coordinate components and that test vectors generated by the test matrix expansion rule R are all the row vectors of the square matrix P.

Respective rows of the square matrix P corresponds to $2^{(2s)}+2^s+1$ points in the two-dimensional projective space having the finite field $GF(2^s)$ as coordinate components, while respective columns of P corresponds to $2^{(2s)}+2^s+1$ straight lines in the two-dimensional projective space. (i, j)-th component of P is 1 only when the j-th straight line passes through the i-th point in the two-dimensional projective space and is 0 otherwise. The number t of linearly independent row vectors of P is $t=3^s+1$, and a $(3^s+1)\times(2^{(2s)}+2^s+1)$ matrix constituted by these linearly independent row vectors of P becomes the group test matrix H. The square matrix P is $(2^s)$-disjunct, and by making all the test vectors generated by the test matrix expansion rule R all the row vectors of the square matrix P, it becomes possible to identify positions of $2^s$ tampered items or less.

Example 4

For example, when s=1, the numbers of points and straight lines in the two-dimensional projective space having the finite field GF(2) as coordinate components are both seven, and an incidence matrix determined by whether or not each of the seven straight lines passes through each of the seven points is calculated as shown in [Expression 1].

$$P = \begin{pmatrix} 0 & 1 & 1 & 0 & 1 & 0 & 0 \\ 0 & 0 & 1 & 1 & 0 & 1 & 0 \\ 0 & 0 & 0 & 1 & 1 & 0 & 1 \\ 1 & 0 & 0 & 0 & 1 & 1 & 0 \\ 0 & 1 & 0 & 0 & 0 & 1 & 1 \\ 1 & 0 & 1 & 0 & 0 & 0 & 1 \\ 1 & 1 & 0 & 1 & 0 & 0 & 0 \end{pmatrix} \quad \text{[Expression 1]}$$

Four row vectors of first to the fourth rows of P are linearly independent. By letting a 4×7 matrix constituted by these four row vectors be a group test matrix H, and letting the test matrix generated by the test matrix expansion rule R be P, since the matrix P is 2-disjunct, it is possible to identify positions of two items or less.

Table 1 shows a size of the test matrix generated by the present example embodiment, for each of s=1 to 13. The second column indicates the number of rows (columns) in the square matrix P, and the rank and the threshold represent a rank and disjunct parameter of P, respectively. For example, when a rank is x and a threshold is y, the group test matrix H has x rows and the group test matrix H expanded according to the test matrix expansion rule R (i.e., HAR) is y-disjunct.

TABLE 1

| s | # of rows (=columns) | Rank | Threshold |
|---|---|---|---|
| 1 | 7 | 4 | 2 |
| 2 | 21 | 10 | 4 |
| 3 | 73 | 28 | 8 |
| 4 | 273 | 82 | 16 |
| 5 | 1,057 | 244 | 32 |
| 6 | 4,161 | 730 | 64 |
| 7 | 16,513 | 2,188 | 128 |
| 8 | 65,793 | 6,562 | 256 |
| 9 | 262,657 | 19,684 | 512 |
| 10 | 1,049,601 | 59,050 | 1,024 |
| 11 | 4,196,353 | 177,148 | 2,048 |
| 12 | 16,781,313 | 531,442 | 4,096 |
| 13 | 67,117,057 | 1,594,324 | 8,192 |

The sixth example embodiment can be summarized as follows. The group test matrix generation part 102 of the MAC tag list generation apparatus 10, the group test matrix generation and expansion part 202 of the MAC tag list verification apparatus 20, or the group test matrix generation and expansion part 303 of the third example embodiment generates the group test matrix H specified as follows.

The group test matrix H in the sixth example embodiment is a submatrix constituted by t linearly independent row vectors of the square matrix P with $2^{(2s)}+2^s+1$ rows and columns, where s is a positive integer. The square matrix P is an incidence matrix determined by points and straight lines in the two-dimensional projective space with a finite field $GF(2^s)$ as coordinate components thereof. The test vectors generated by the test matrix expansion rule R are all the row vectors of the square matrix P.

Seventh Example Embodiment

The following describes a seventh example embodiment in which the group test matrix H of the first to the third example embodiments described above is modified.

The group test matrix H in the seventh example embodiment is a submatrix constituted by t linearly independent row vectors of a matrix A_r with the number of rows $r \times (2^s - 1) + 1$ and the number of columns $2^{(2s)} - 1 + r$, where s is a positive integer and r is an integer of 3 or more and $2^s + 1$ or less, the matrix A_r is an incidence matrix determined by $r \times (2^s - 1) + 1$ points on r prespecified straight lines passing through the origin of a two-dimensional affine space having the finite field $GF(2^s)$ as coordinate components and $2^{(2s)} - 1 + r$ straight lines passing through any of these points, and test vectors generated by the test matrix expansion rule R are all the row vectors of the matrix A_r.

The (i, j)-th component of A_r is 1 only when the j-th straight line in a set of the $2^{(2s)} - 1 + r$ straight lines passes through the i-th point in a set constituted by the $r \times (2^s - 1) + 1$ points in the two-dimensional affine space, and is 0 otherwise. The number t of the linearly independent row vectors of the matrix A_r is given by the following expression [Expression 2].

$$t = \sum_{i=0}^{\lfloor \log_2 r \rfloor} \binom{s}{i} 2^i + \sum_{i=\lfloor \log_2 r \rfloor + 1}^{s} \binom{s}{i} r \quad \text{[Expression 2]}$$

The group test matrix H is a $t \times (2^{(2s)} - 1 + r)$ matrix constituted by the t linearly independent row vectors of the matrix A_r. The matrix A_r is (r−2)-disjunct, and the positions of r−2 tampered items or less can be identified by setting the entire test vectors generated by the test matrix expansion rule R as all the row vectors of the matrix Ar.

Example 5

For example, when s=2, on a two-dimensional affine plane having a finite field GF(4) as coordinate components, for a total of 10 points on three straight lines passing though the origin, there are 18 straight lines passing through any of these points, and an incidence matrix determined by whether or not a straight line thereof passes through the 10 points is calculated by the following [Expression 3].

$$A\_3 = \begin{pmatrix} 0 & 0 & 0 & 1 & 0 & 0 & 1 & 0 & 0 & 0 & 0 & 1 & 1 & 0 & 0 & 1 & 0 & 0 \\ 0 & 0 & 0 & 0 & 1 & 0 & 0 & 1 & 0 & 1 & 0 & 0 & 0 & 1 & 0 & 1 & 0 & 0 \\ 0 & 0 & 0 & 0 & 0 & 1 & 0 & 0 & 1 & 0 & 1 & 0 & 0 & 0 & 1 & 1 & 0 & 0 \\ 1 & 0 & 0 & 1 & 0 & 0 & 0 & 0 & 1 & 1 & 0 & 0 & 0 & 0 & 0 & 0 & 1 & 0 \\ 0 & 1 & 0 & 0 & 1 & 0 & 1 & 0 & 0 & 0 & 1 & 0 & 0 & 0 & 0 & 0 & 1 & 0 \\ 0 & 0 & 1 & 0 & 0 & 1 & 0 & 1 & 0 & 0 & 0 & 1 & 0 & 0 & 0 & 0 & 1 & 0 \\ 1 & 0 & 0 & 0 & 0 & 1 & 1 & 0 & 0 & 0 & 0 & 0 & 1 & 0 & 0 & 0 & 0 & 1 \\ 0 & 1 & 0 & 1 & 0 & 0 & 0 & 1 & 0 & 0 & 0 & 0 & 0 & 1 & 0 & 0 & 0 & 1 \\ 0 & 0 & 1 & 0 & 1 & 0 & 0 & 0 & 1 & 0 & 0 & 0 & 1 & 0 & 0 & 0 & 0 & 1 \\ 0 & 0 & 0 & 0 & 0 & 0 & 0 & 0 & 0 & 0 & 0 & 0 & 0 & 0 & 1 & 1 & 1 & 1 \end{pmatrix}$$

[Expression 3]

The eight row vectors from the first to the eighth rows of A_3 are linearly independent. When letting the 8×18 matrix constructed from these eight row vectors be the group test matrix H and letting a test matrix generated by the test matrix expansion rule R eb A_3, since A_3 is 1-disjunct, it is possible to identify a position of one tampered item according to the present example embodiment.

Below listed [Table 2] shows the matrices A_r generated according to the present invention with a size thereof fixed to $r=2^s+1$, where s=1 to 13. As in [Table 1], second and the third columns are the numbers of rows and columns in A_r, and a rank and a threshold d represent rank and a disjunct parameter of A_r, respectively. For example, with rank x and threshold y, the group test matrix H has x rows and the test matrix A_r expanded according to the test matrix expansion rule R (i.e., H^R) is y-disjunct.

TABLE 2

| s | # of rows | # of columns | Rank | Threshold |
|---|---|---|---|---|
| 1 | 4 | 6 | 3 | 1 |
| 2 | 16 | 20 | 9 | 3 |
| 3 | 64 | 72 | 27 | 7 |
| 4 | 256 | 272 | 81 | 15 |
| 5 | 1,024 | 1,056 | 243 | 31 |
| 6 | 4,096 | 4,160 | 729 | 63 |
| 7 | 16,384 | 16,512 | 2,187 | 127 |
| 8 | 65,536 | 65,792 | 6,561 | 255 |
| 9 | 262,144 | 262,656 | 19,683 | 511 |
| 10 | 1,048,576 | 1,049,600 | 59,049 | 1,023 |
| 11 | 4,194,304 | 4,196,352 | 177,147 | 2,047 |
| 12 | 16,777,216 | 16,781,312 | 531,441 | 4,095 |

The seventh example embodiment can be summarized as follows. The group test matrix generation part 102 of the MAC tag list generation apparatus 10, the group test matrix generation and expansion part 202 of the MAC tag list verification apparatus 20, or the group test matrix generation and expansion part 303 of the third example embodiment generates the group test matrix H defined as follows.

The group test matrix H is a submatrix constituted by t linearly independent row vectors of a matrix A_r with $r\times(2^s-1)+1$ rows and $2^{(2s)}-1+r$ columns, where s is a positive integer and r is an integer of 3 or more and $2^s+1$ or less. The matrix A_r is an incidence matrix determined by $r\times(2^s-1)+1$ points on r prespecified straight lines passing through the origin of a two-dimensional affine space with a finite field $GF(2^s)$ as coordinate components and $2^{(2s)}-1+r$ straight lines passing through any of these points. Test vectors generated by the test matrix expansion rule R are all the row vectors of the matrix A_r.

The above describes each example embodiment of the present invention. It is to be understood that the present invention is not limited to the above described example embodiments and that further modifications, replacements, and adjustments may be added without departing from the basic technical concept of the present invention. For example, a network configuration, a configuration of each element, and a representation form of each message shown in each drawing are examples to facilitate understanding of the present invention and are not limited to the configurations shown in the drawings. Further, in the following description, "A and/or B" means at least one of A and B. In addition, although there are ports or interfaces at input/output connection points of each block in the drawings, these are not illustrated.

Further, procedures described in the first to the seventh example embodiments can be implemented by a program causing a computer (9000 in FIG. 12) functions, as an apparatus constituting the MAC tag list generation apparatus 10, the MAC tag list verification apparatus 20, and the aggregate MAC verification system 30 to implement the functions of these apparatuses. Such a computer is illustrated in a configuration comprising a CPU (Central Processing Unit) 9010, a communication interface 9020, a memory 9030, and an auxiliary storage apparatus 9040 shown in FIG. 12. That is, the CPU 9010 in FIG. 12 may execute a tag list computation program or tag list verification program to update each computation parameter held in the auxiliary storage apparatus 9040 thereof.

That is, each part (processing means, function) of each apparatus described in the first to the seventh example embodiments can be realized by a computer program causing a processor provided in these apparatuses to execute each processing described above using the hardware thereof.

Finally, preferred modes of the present invention will be summarized.

[Mode 1]

(Refer to a MAC tag list generation apparatus according to the first aspect.)

[Mode 2]

A nonce-based linear CGT MAC application part of the MAC tag list generation apparatus may be configured to generate the MAC tag list T=(T[1], . . . , T[t]) by summing all outputs obtained by supplying the item M[j] and an index j (j=1, . . . , m) to the pseudorandom function F for the index j of any column that is 1 in the i-th row of the group test matrix H, further summing the sum of the outputs of the pseudorandom function F and the result of supplying the nonce N and the i to the pseudorandom function G, and setting the obtained output as the MAC value T[i] corresponding to the i-th test.

[Mode 3]

It is preferable that the group test matrix H may be a submatrix constituted by t linearly independent row vectors of a square matrix P with $2^{(2s)}+2^s+1$ rows and columns for a positive integer s, the square matrix P may be an incidence matrix determined by points and straight lines in a two-dimensional projective space having a finite field GF($2^s$) as coordinate components, and that test vectors generated by a test matrix expansion rule R may be all the row vectors of the square matrix P.

[Mode 4]

It is preferable that the group test matrix H may be a submatrix constituted by t linearly independent row vectors of a matrix A_r with r×($2^s$−1)+1 rows and $2^{(2s)}$−1+r columns for a positive integer s and an integer r of 3 or more and $2^s$+1 or less, the matrix A_r may be an incidence matrix determined by r×($2^s$−1)+1 points on r prespecified straight lines passing through the origin of a two-dimensional affine space having a finite field GF($2^s$) as coordinate components and $2^{(2s)}$−1+r straight lines passing through any of these points, and test vectors generated by a test matrix expansion rule R may be all the row vectors of the matrix Ar.

[Mode 5]

It is preferable that the group test matrix H may satisfy $m=2^r-1$ and t=r for an integer r>1, the group test matrix H may be constructed from a basis over a finite field GF(2) of an m-rows and m-columns binary matrix modHad(r) obtained by deleting the first row and the first column from an (m+1)-rows and (m+1)-columns Hadamard matrix Had(r) and, out of elements −1 and 1 of the Hadamard matrix Had(r), −1 being replaced with 0, and that a test matrix expansion rule R may be such that modHad(r) is obtained when rows of the group test matrix H are expanded according to the test matrix expansion rule R.

[Mode 6]

It is preferable that when letting (a, b)=a!/(a−b)!b! be the number of ways for selecting b items from a items for positive integers a and b and letting ((a, b)) be the entire subsets having a size of b out of a set $\{1, 2, \ldots, a\}$, the group test matrix H may be Macula's matrix, having positive integer parameters (n, k, d), constituted by a basis over a finite field GF(2) of such an (n, d)×(n, k) binary matrix that, after associating the column and row indices with the elements of ((n, d)) and ((n, k)) in an appropriate order, when an element D of a certain ((n, d)) is included in an element K of ((n, k)), the (D, K) entry of the matrix H is 1 and other entries are 0.

[Mode 7]

(Refer to the MAC tag list verification apparatus according to the second aspect.)

[Mode 8]

A nonce-based linear CGT MAC application part of the above described MAC tag list verification apparatus may be configured to generate the verification MAC tag list T*=(T*[1], . . . , T*[t]) by summing all outputs obtained by supplying the i-th item M[i] and an index i to the pseudorandom function F for the index i of any row that is 1 in the j-th column of the group test matrix H, further summing the sum of the outputs of the pseudorandom function F and the result of supplying the nonce N to the pseudorandom function G, and setting the obtained output as the verification MAC value T*[i] corresponding to the j-th test.

[Mode 9]

(Refer to the aggregate MAC verification system according to the third aspect.)

[Mode 10]

(Refer to the MAC tag list generation method according to the fourth aspect.)

[Mode 11]

(Refer to the MAC tag list verification method according to the fifth aspect.)

Further, Mode 7 and Modes 9 to 11 can be developed into Modes 2 to 6 like Mode 1. In addition, the aggregate MAC verification system of Mode 9 may be divided into an aggregator node A and a verification node C.

Further, each disclosure of Patent Literatures and NPLs cited above is incorporated herein in its entirety by reference thereto. It is to be noted that it is possible to modify or adjust the example embodiments or examples within the whole disclosure of the present invention (including the claims) and based on the basic technical concept thereof. Further, it is possible to variously combine or select (or partially delete) a wide variety of the disclosed elements (including the individual elements of the individual claims, the individual elements of the individual example embodiments or examples, and the individual elements of the individual figures) within the scope of the disclosure of the present invention. That is, it is self-explanatory that the present invention includes any types of variations and modifications to be done by a skilled person according to the whole disclosure including the claims, and the technical concept of the present invention. Particularly, any numerical ranges disclosed herein should be interpreted that any intermediate values or subranges falling within the disclosed ranges are also concretely disclosed even without specific recital thereof.

The present invention can be applied to tampering detection and tampered position identification in wireless or wired data communication, database, file system, virus scanning, and version control system.

The invention claimed is:

1. A message authentication code (MAC) tag list generation apparatus comprising:
   a memory storing program instructions; and
   a processor configured to execute the program instructions stored in the memory to implement:
   a message input part that receives a nonce N which is a non-overlapping value for each MAC generation process and a message M constituted by m items M[1], . . . , and M[m], each being a target of MAC;
   a group test matrix generation part that generates a t-rows and m-columns group test matrix H which are parameters of a combinatorial group test, with regard to s (where s is a positive integer), which is a number of the MACs to be generated;
   a nonce-based linear combinatorial group testing (CGT) MAC application part that generates, for the message M, a MAC value T[i] corresponding to an i-th test (i=1, . . . , t), using the group test matrix H, the nonce N, and pseudorandom functions F and G with variable length input and fixed length output to generate a MAC tag list T=(T[1], . . . , T[t]); and
   a MAC tag list output part that outputs the MAC tag list obtained by the nonce-based linear CGT MAC application part.

2. The MAC tag list generation apparatus according to claim 1, wherein the processor is configured to execute the program instructions to implement the nonce-based linear CGT MAC application part that, in generating the i-th MAC value T[i] (i=1, . . . , t) of the MAC tag list T=(T[1], . . . , T[t]), sums, for an index j (j=1, . . . , m) of any column that takes a value 1 in the i-th row of the group test matrix H, all outputs outputted from the pseudorandom function F with an item M[j] and the index j supplied as inputs thereto,
   further sums the sum of the outputs from the pseudorandom function F and a result outputted from the pseudorandom function G with the nonce N and the i supplied as inputs thereto, and sets an output obtained as the MAC value T[i] corresponding to the i-th test.

3. The MAC tag list generation apparatus according to claim 1, wherein the group test matrix H is a submatrix constituted by t linearly independent row vectors of a square matrix P with $2^{(2s)}+2^s+1$ rows and columns, where s is a positive integer, wherein the square matrix P is an incidence matrix determined by points and straight lines in a two-dimensional projective space with a finite field $GF(2^s)$ as coordinate components, and wherein test vectors generated by a test matrix expansion rule R are all the row vectors of the square matrix P.

4. The MAC tag list generation apparatus according to claim 1, wherein the group test matrix H is a submatrix constituted by t linearly independent row vectors of a matrix A_r with a number of rows being $r\times(2^s-1)+1$ rows and a number of columns being $2^{(2s)}-1+r$, where s is a positive integer and r is an integer of 3 or more and $2^s+1$ or less, wherein the matrix A_r is an incidence matrix determined by $r\times(2^s-1)+1$ points on r prespecified straight lines passing through the origin of a two-dimensional affine space with a finite field $GF(2^s)$ as coordinate components, and $2^{(2s)}-1+r$ straight lines passing through any of the points, and wherein test vectors generated by a test matrix expansion rule R are all the row vectors of the matrix A_r.

5. The MAC tag list generation apparatus according to claim 1, wherein the group test matrix H satisfies $m=2^r-1$ and $t=r$ for an integer $r>1$, wherein the group test matrix H is composed by a basis over a finite field GF(2) of an m×m binary matrix modHad(r) obtained by deleting the first row and the first column from an m+1×m+1 Hadamard matrix Had(r) and, out of elements −1 and 1 of the Hadamard matrix, further relacing −1 with 0, and wherein a test matrix expansion rule R is such that modHad(r) is obtained when the rows of the group test matrix H are expanded according to the test matrix expansion rule R.

6. A message authentication code (MAC) tag list verification apparatus comprising:

a memory storing program instructions; and a processor configured to execute the program instructions stored in the memory to implement:

a message input part that receives, as MAC tag list verification targets, a nonce N, a message M constituted by m items M[1], . . . , M[m], and a MAC tag list T=(T[1], . . . , T[t]), which is a list of t MAC values;

a group test matrix generation and expansion part that generates a t×m group test matrix H serving as combinatorial group testing parameters and outputs a test matrix expansion rule R constituted by v elements (where v>t) that are subsets of row indices of the group test matrix H;

a nonce-based linear combinatorial group testing (CGT) MAC application part that generates a MAC value T*[j] corresponding to the j-th test (j=1, . . . , t), using the group test matrix H, the nonce N, and pseudorandom functions F and G with variable length input and fixed length output for the message M to generate a verification MAC tag list T*=(T*[1], . . . , T*[t]);

a MAC tag list expansion part that using the MAC tag list T, the verification MAC tag list T*, and the test matrix expansion rule R, performs linear combination in each of the MAC tag list T and the verification MAC tag list T* corresponding to subsets of row indices specified by the test matrix expansion rule R to output an expanded MAC tag list exT and an expanded verification MAC tag list exT*;

a MAC tag list verification part that compares the expanded MAC tag list exT and the expanded verification MAC tag list exT*, verifies each item in the message M, identifies a position of a tampered item, and outputs a result as a verification result; and a verification result output part that outputs the verification result outputted by the MAC tag list verification part.

7. The MAC tag list verification apparatus according to claim 6, wherein the processor is configured to execute the program instructions to implement the nonce-based linear CGT MAC application part that, in generating the i-th verification MAC tag value T*[j](j=1, . . . , t) of the verification MAC tag list T*=(T*[1], . . . , T*[t]), sums all outputs obtained from the pseudorandom function F with the i-th item M[i] and an index i supplied as inputs thereto for an index i of any row that takes a value 1 in the j-th column of the group test matrix H, further sums the sum of the outputs of the pseudorandom function F and a result of the pseudorandom function G with the nonce N supplied as an input thereto, and sets the obtained output as the verification MAC value T*[j] corresponding to the j-th test.

8. The MAC tag list verification apparatus according to claim 6, wherein the group test matrix H is a submatrix constituted by t linearly independent row vectors of a square matrix P with $2^{(2s)}+2^s+1$ rows and columns for a positive integer s, wherein the square matrix P is an incidence matrix determined by points and straight lines in a two-dimensional projective space having a finite field $GF(2^s)$ as coordinate components, and wherein test vectors generated by the test matrix expansion rule R are all the row vectors of the square matrix P.

9. The MAC tag list verification apparatus according to claim 6, wherein the group test matrix H is a submatrix constituted by t linearly independent row vectors of a matrix A_r having $r\times(2^s-1)+1$ rows and $2^{(2s)}-1+r$ columns for a positive integer s and an integer r of 3 or more and $2^s+1r$ less, wherein the matrix A_r is an incidence matrix determined by $r\times(2^s-1)+1$ points on r prespecified straight lines passing through the origin of a two-dimensional affine space with a finite field $GF(2^s)$ as coordinate components and $2^{(2s)}-1+r$ straight lines passing through any of these points, and wherein test vectors generated by the test matrix expansion rule R are all the row vectors of the matrix A_r.

10. The MAC tag list verification apparatus according to claim 6, wherein the group test matrix H satisfies $m=2^r-1$ and $t=r$ for an integer $r>1$, wherein the group test matrix H is composed by a basis over a finite field GF(2) of an m×m binary matrix modHad(r) obtained by deleting the first row and the first column from an m+1×m+1 Hadamard matrix Had(r) and out of elements −1 and 1 of the Hadamard matrix, further relacing −1 with 0, and wherein the test matrix expansion rule R is such that modHad(r) is obtained when the rows of the group test matrix H are expanded according to the test matrix expansion rule R.

11. The MAC tag list verification apparatus according to claim 6, wherein letting (a, b)=a!/(a−b)!b! denote a number of ways for selecting b items from a items, where a and b are positive integers, and letting ((a, b)) denote an entirety of subsets having a size of b of a set {1, 2, . . . , a}, the group test matrix H is Macula's matrix, having positive integer parameters (n, k, d), constituted by a basis over a finite field GF(2) of such an (n, d)×(n, k) binary matrix that, after associating column and row indices with the elements of ((n, d)) and ((n, k)) in an appropriate order, when an element D of a certain ((n, d)) is included in an element K of ((n, k)), the (D, K) entry of the group test matrix H takes a value 1 and other entries take a value 0.

12. An aggregate message authentication code (MAC) verification system comprising:
an aggregator node; and
a verification node, wherein
the aggregator node includes:
a first memory storing program instructions; and
a first processor configured to execute the program instructions stored in the first memory to implement:
a group test matrix generation part that outputs a t×m group test matrix H;
a MAC tag aggregation part that receives m message tag pairs (M[1], T[1]), . . . , (M[m], T[m]) sent from m nodes, performs tag aggregation according to the group test matrix H, and outputs an aggregate tag list V=(V[1], . . . , V[t]) constituted by t aggregate tags and a message list M=(M[1], . . . , M[m]); and
a group test matrix generation part that outputs a test matrix expansion rule R constituted by v elements (where v>t) that are subsets of the row indices of the group test matrix H, wherein
an individual one of the m nodes
receives a message M[i] (i=1, . . . ,m), and
obtains a single MAC tag T[i] for the message M[i] to output the tag, wherein
the verification node includes:
a second memory storing program instructions; and
a second processor configured to execute the program instructions stored in the second memory to implement:
an aggregate MAC tag list expansion part that obtains a linear combination of the elements in the aggregate tag list V according to the test matrix expansion rule R and outputs an expanded aggregate tag list exV;
an expanded aggregate MAC tag list verification part that performs verification using the message list M, the expanded aggregate tag list exV, and the test matrix expansion rule R, identifies a tampered node, and outputs a verification result; and
a verification result output part that outputs the verification result outputted by the expanded aggregate MAC tag list verification part.

13. The aggregate MAC verification system according to claim 12, wherein the group test matrix H is a submatrix constituted by t linearly independent row vectors of a square matrix P with $2^{(2s)}+2^s+1$ rows and columns for a positive integer s, wherein
the square matrix P is an incidence matrix determined by points and straight lines in a two-dimensional projective space having a finite field $GF(2^s)$ as coordinate components, and wherein
test vectors generated by the test matrix expansion rule R are all the row vectors of the square matrix P.

14. The aggregate MAC verification system according to claim 12, wherein the group test matrix H is a submatrix constituted by t linearly independent row vectors of a matrix A_r having $r \times (2^s - 1) + 1$ rows and $2^{(2^{\hat{}})} - 1 + r$ columns for a positive integer s and an integer r of 3 or more and $2^s+1$ or less, wherein
the matrix A_r is an incidence matrix determined by $r \times (2^s - 1) + 1$ points on r prespecified straight lines passing through the origin of a two-dimensional affine space having a finite field $GF(2^s)$ as coordinate components and $2^{(2s)} - 1 + r$ straight lines passing through any of these points, and wherein
test vectors generated by the test matrix expansion rule R are all the row vectors of the matrix A_r.

15. The aggregate MAC verification system according to claim 12, wherein the group test matrix H satisfies $m=2^r-1$ and t=r for an integer r>1, wherein
the group test matrix H is composed by a basis over a finite field GF(2) of an m×m binary matrix modHad(r) obtained by deleting the first row and the first column from an m+1×m+1 Hadamard matrix Had(r) and, out of matrix elements values −1 and 1, relacing −1 with 0, and wherein
the test matrix expansion rule R is such that modHad(r) is obtained when the rows of the group test matrix H are expanded according to the test matrix expansion rule R.

16. A method for generating a message authentication code (MAC) tag list, the method comprising:
receiving a nonce N that is a unique value to each MAC generation process and a message M constituted by m items M[1], . . . , M[m] to which MAC is to be applied;
generating a t×m group test matrix H serving as combinatorial group testing parameters for s (where s is a positive integer) which is a number of the MACs to be generated;
generating a MAC tag list T=(T[1], . . . , T[t]) by generating a MAC value T[i] corresponding to the i-th test (i=1, . . . , t) using the group test matrix H, the nonce N, and pseudorandom functions F and G with variable length input and fixed length output for the message M; and
outputting the MAC tag list.

17. The method according to claim 16 for verifying the MAC tag list T=(T[1], . . . , T[t]) generated, comprising:
receiving, as MAC tag list verification targets, a nonce N, a message M constituted by m items M[1], . . . , M[m], and the MAC tag list T=(T[1], . . . , T[t]);
generating a t×m group test matrix H serving as combinatorial group testing parameters and outputting a test matrix expansion rule R constituted by v elements (where v>t) that are subsets of the row indices of the group test matrix H;
generating a verification MAC tag list T*=(T*[1], . . . , T*[t]) by generating a MAC value T*[j] corresponding to the j-th test (j=1, . . . , t) using the group test matrix H, the nonce N, and pseudorandom functions F and G with variable length input and fixed length output for the message M;
outputting an expanded MAC tag list exT and an expanded verification MAC tag list exT* by performing linear combination in each of the MAC tag list T and the verification MAC tag list T* corresponding to subsets of the row indices specified by the test matrix expansion rule R and using the MAC tag list T, the verification MAC tag list T*, and the test matrix expansion rule R;
comparing the expanded MAC tag list exT with the expanded verification MAC tag list exT*, verifying each item in the message M, identifying the position of any tampered item, and outputting a verification result; and outputting the verification result.

18. The method according to claim 16, comprising:

in generating the i-th MAC value T[i] (i=1, . . . , t) of the MAC tag list T=(T[1], . . . , T[t]), summing, for an index j (j=1, . . . , m) of any column that takes a value 1 in the i-th row of the group test matrix H, all outputs outputted from the pseudorandom function F with an item M[j] and the index j supplied as inputs thereto, further summing the sum of the outputs from the pseudorandom function F and a result outputted from the pseudorandom function G with the nonce N and the i supplied as inputs thereto, and setting an output obtained as the MAC value T[i] corresponding to the i-th test.

19. The method according to claim 17, comprising:

in generating the i-th verification MAC tag value T*[j] (j=1, . . . , t) of the verification MAC tag list T*=(T*[1], . . . , T*[t]), summing all outputs obtained from the pseudorandom function F with the i-th item M[i] and an index i supplied as inputs thereto for an index i of any row that takes a value 1 in the j-th column of the group test matrix H, further summing the sum of the outputs of the pseudorandom function F and a result of the pseudorandom function G with the nonce N supplied as an input thereto, and setting a result of the further summing, as the verification MAC value T*[j] corresponding to the j-th test.

* * * * *